US006496833B1

(12) United States Patent
Goldberg et al.

(10) Patent No.: US 6,496,833 B1
(45) Date of Patent: Dec. 17, 2002

(54) SYSTEM AND METHOD FOR GENERATING CODE FOR QUERY OBJECT INTERFACING

(75) Inventors: Robert N. Goldberg, Redwood City, CA (US); Gloria Y. Lam, Milpitas, CA (US); Chung Le, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/431,645

(22) Filed: Nov. 1, 1999

(51) Int. Cl.⁷ .............................................. G06F 17/30
(52) U.S. Cl. ...................................... 707/102; 707/103 R
(58) Field of Search ................................ 707/100, 102, 707/103, 3, 10; 717/1, 2

(56) References Cited

U.S. PATENT DOCUMENTS

| | | | |
|---|---|---|---|
| 5,487,141 A | | 1/1996 | Cain et al. |
| 5,499,371 A | * | 3/1996 | Henninger et al. ......... 707/102 |
| 5,504,885 A | | 4/1996 | Alashqur |
| 5,644,764 A | * | 7/1997 | Johnson et al. ............. 707/103 |
| 5,819,282 A | * | 10/1998 | Hooper et al. .............. 707/100 |
| 5,937,409 A | * | 8/1999 | Wetherbee ...................... 707/1 |
| 5,953,526 A | * | 9/1999 | Day et al. ....................... 717/1 |
| 6,006,224 A | * | 12/1999 | McComb et al. ........... 707/102 |
| 6,047,284 A | | 4/2000 | Owens et al. |
| 6,076,092 A | * | 6/2000 | Goldberg et al. ........... 345/804 |
| 6,081,808 A | | 6/2000 | Blackman et al. |
| 6,199,195 B1 | * | 3/2001 | Goodwin et al. ........... 707/100 |
| 6,212,672 B1 | * | 4/2001 | Keller et al. .................... 717/1 |
| 6,223,184 B1 | * | 4/2001 | Blackman et al. ...... 707/103 R |
| 6,260,078 B1 | * | 7/2001 | Fowlow ....................... 709/316 |
| 6,263,328 B1 | * | 7/2001 | Coden et al. ................. 707/10 |
| 6,282,547 B1 | | 8/2001 | Hirsch |

* cited by examiner

*Primary Examiner*—John Breene
*Assistant Examiner*—Debbie Le
(74) *Attorney, Agent, or Firm*—Kudirka & Jobse, LLP

(57) ABSTRACT

A query object generator tool is used to generate interface definitions and source code which implement a database query object. The tool allows a client to construct a query object without being familiar with the underlying database language and without being concerned with programming details such as concurrency problems and connection management. The tool consists of an internal state object which represents the query object, including information which can be saved to reconstruct the query object at a later date, and code generator objects which generate the code required to implement the query object defined by the internal state object. In a preferred embodiment, the code generator objects are arranged in a hierarchy so that a generator object can be instantiated which generator object is specific to the database to be accessed and the language to which the implementation is targeted. An optional graphic user interface (GUI) may also be provided to allow a user to interact with the tool.

23 Claims, 16 Drawing Sheets

SYSTEM AND METHOD FOR GENERATING CODE FOR QUERY OBJECT INTERFACING

FIELD OF THE INVENTION

The present invention relates, in general, to databases and methods for accessing such databases with query objects, and, in particular, to a system and methods for generating the query objects.

BACKGROUND OF THE INVENTION

Databases represent an important data processing area in many applications. They are often used to store large amounts of information and then efficiently retrieve selected portions of the information. Many present day systems use a client/server database approach in which application programs running in clients access a central database management system (DBMS) located in a database server. In order to efficiently access the information in the database, the clients form queries which request information with selected characteristics. The queries are transmitted to the DBMS server which retrieves the desired information which meets the characteristics specified in the query and the results (commonly called a "result set") are returned to the client.

Presently, such database environments are predominantly based on a "two-tiered" model consisting of a top tier containing one or more applications which generate queries that access the DBMS server in a bottom tier. The two-tiered model suffers from several drawbacks. First, the queries must be formulated in a specific query language, which is accepted by the DBMS server. While standard query languages exist, such as the Structured Query Language (SQL), specific DBMS query languages are often non-standard as a result of proprietary extensions made to the basic SQL query language. As a result, application programs written to generate queries in a particular query language are often not portable between different DBMS servers.

In addition, in order to generate the queries in the first place, each application developer, and, in some cases, the ultimate user, must understand the mechanics of the database, including the relationship of the files and tables therein and any relationships in the data required by the database organization. These relationships are commonly referred to as "business logic" since the relationships are typically based on shared business processes, practices and policies. Therefore, many parties must learn the business logic in order to generate meaningful queries.

Further, commonly-performed routines are typically replicated in each application program even if the application programs operate within the same business environment because each application functions autonomously from the other applications. This replication results in poor code re-use and maintenance problems if the replicated routines must be changed.

Consequently, there is a trend towards using a three-tiered model for database environments. Generally, the top tier in such a model consists of clients containing the application programs and the user interfaces, the middle tier consists of code that embodies the business logic and the bottom tier consists of the DBMS servers which contain the data. In this model, the applications are implemented as "thin" clients, all of which interface with the business logic by means of a common interface which does not involve knowledge of the business logic. The commonly-performed routines are all consolidated into the middle tier as part of the business logic. Since the business logic is shareable between the clients, code replication is avoided. The Common Object Request Broker Architecture (CORBA) presents one object-oriented approach to forming a three-tiered database environment, such as described in R. Orfali et al., "The Essential Client/Server Survival Guide," pp. 375–458, John Wiley & Sons, Inc. (2d ed. 1996), the disclosure of which is incorporated herein by reference.

Several prior art methods of implementing the three-tiered model exist, however, most existing DBMS access mechanisms and tools, including fourth generation languages (4GLs) and application programming interfaces (APIs), have been designed for the two-tiered model and are ill-suited for use in the three-tiered model. Consequently, several prior art designs including "database" objects and "active data" objects have their own strengths and drawbacks. One promising prior art approach to constructing a middle tier containing business logic uses "query objects." Each query object is a server object that:

(1) translates client method invocations into equivalent queries in a query language which is understood by a database;
(2) issues those queries to the database; and
(3) returns the results as strongly-typed data values.

The query object effectively encapsulates the DBMS specific query language so that the application programs do not have to know or use the DBMS query language. Query objects also encapsulate the database organization or "schema," so that query object clients are isolated from database changes (although the query object itself may have to be changed if the underlying database must be changed.) Query objects also present their clients with a DBMS independent API, for example, CORBA defines an Interface Definition Language (IDL) interface. They do not require that the data be mapped into objects as is the case with active data objects so that significant performance advantages can be obtained and concurrency issues avoided.

Each query object provides as part of its interface one or more parameterized methods and calls on each method are translated by the query object into one or more standard queries such as SELECT, UPDATE, INSERT and DELETE or into the initiation of one or more stored procedures in the database. In order to use the query object, a client first establishes a connection to the query object via some mechanism, such as the CORBA naming service. One of the query object's methods is then invoked and the query object then executes the query.

However, in order to operate properly, the query object must be constructed to generate the correct DBMS queries in response to client requests. Constructing a query object to generate the correct queries requires a knowledge of SQL, an understanding of the underlying database schema, the possible handling of intermediate results generated by the query and interpretation of the results. In addition, a query object developer must consider other issues such as connection to the database using CORBA or similar arrangement, concurrency problems and translation required between the interface used by the query object and the API used by the database. Consequently, many query objects, including the most general query objects, are hand-written by skilled and knowledgeable developers. Hand-written objects are difficult to maintain and may require rewriting if the database schema changes. Therefore, it would be desirable to automate the generation of query objects.

SUMMARY OF THE INVENTION

The foregoing problems are solved in one illustrative embodiment of the invention in which a query object generator tool is used to generate interface definitions and code which implement a query object. The tool consists of an internal state object which represents the query object, including information which can be saved to reconstruct the query object at a later date, and code generator objects which generate the code required to implement the query object defined by the internal state object. In accordance with one embodiment, the code generator objects are arranged in a hierarchy so that a generator object can be instantiated which is specific to the database to be accessed and the language to which the implementation is targeted. An optional graphic user interface (GUI) may also be provided to allow a user to interact with the tool.

During operation, the inventive generator tool uses a special query object to access and extract database schema information from the database. The database schema can be displayed to the user using the GUI. The generator tool then receives input queries which may be text strings or may be constructed with a graphic interface. The text strings can be entered from either a command line or by means of the interactive GUI and may include parameters. Alternatively, a graphic interface such as a "query by example" interface or another similar mechanism can be used to allow users to construct a query even though they do not have knowledge of a particular query language.

The generator tool then instantiates the correct code generator object for the database and selected implementation logic and the generator object generates both interface code to allow a client to access the object and code which implements the object for a specific DBMS and transactional model.

In accordance with a preferred embodiment, the code generator object also generates build scripts which can be run to compile and build the query object. The code generator may also generate code which defines a GUI for testing the object and build scripts for creating the test environment. Once the test environment has been created, it can be used to install the query object and then use the query object to access the database with sample test queries. The results can then be viewed using the test GUI to verify correct operation of the query object.

In accordance with another embodiment, the inventive generator tool can also generate query objects that implement "boilerplate" operations for specific "objects" in the database, such as base tables, views and stored procedures.

BRIEF DESCRIPTION OF THE DRAWINGS

The above and further advantages of the invention may be better understood by referring to the following description in conjunction with the accompanying drawings and which.

DESCRIPTION OF THE PREFERRED EMBODIMENT

Figure 1:
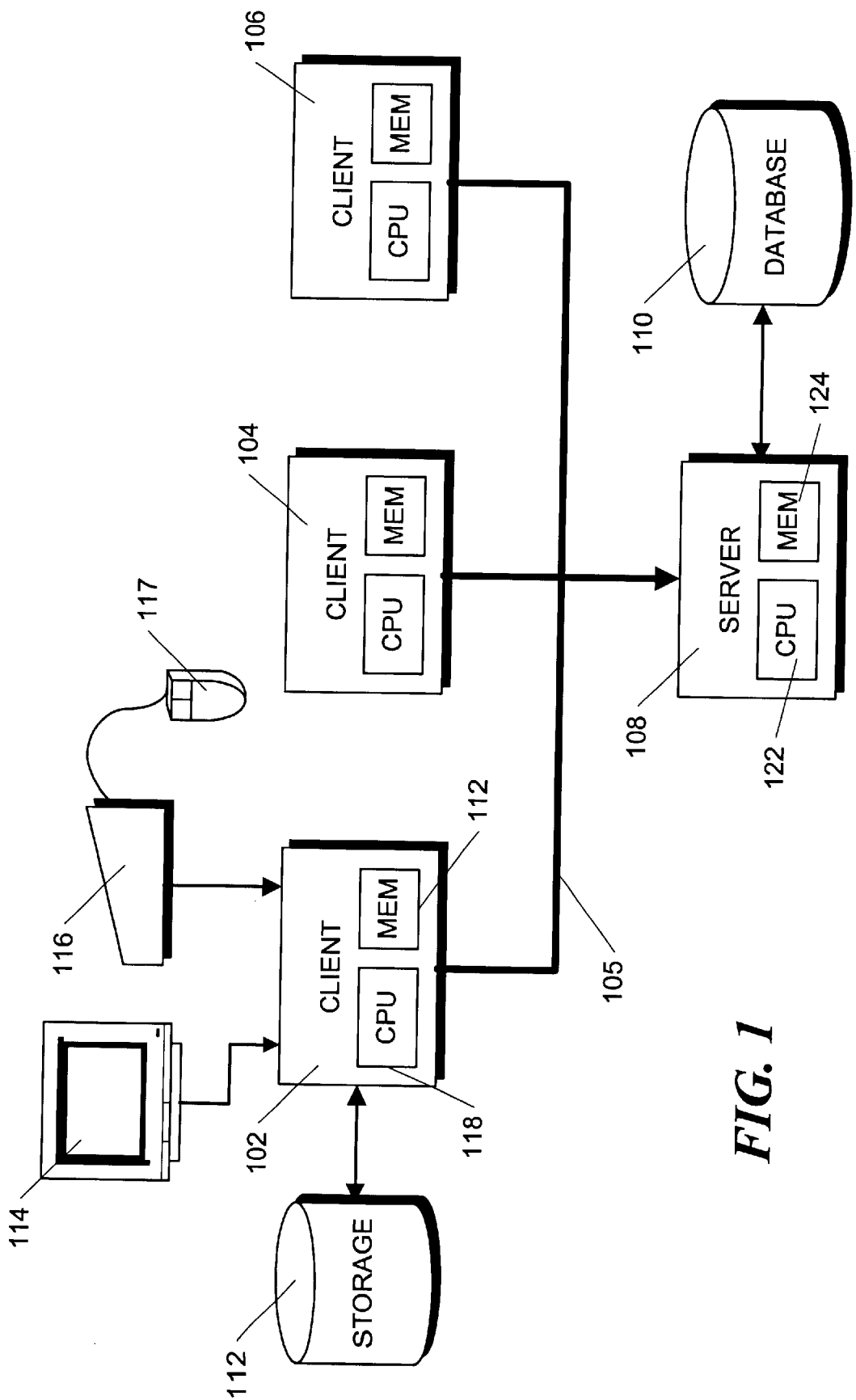
FIG. 1 is a block schematic diagram of a client server system on which the present invention can be operated.

FIG. 1 is a block diagram of a system 100 on which an illustrative query object generator tool constructed according to the present invention can run. As shown, the system 100 is a distributed computing environment comprising a plurality of individual computer nodes 102, 104, 106 and 108. The nodes are functionally organized into clients 102, 104 and 106 and at least one server 108 interconnected over a network 105. However, the clients 102, 104 and 106 and server 108 can also be implemented on a single node. Each node, whether a client 102, 104, 106 or server 108, is a conventionally programmed digital computer, respectively including a central processing unit (CPU) 118, 122, and a main memory 112, 124 interconnected with the CPU 118, 122. In addition, each client 102–106 and server 108 can include user interfacing devices, such as a monitor 114, keyboard 116 and mouse 117 and a storage device 112 (shown in FIG. 1, by way of example, for just one client 102). The server 108 includes a database 110, such as a relational database, file system or other organized data storage system. The individual components implementing each node 102–108 are interconnected over a central system bus (not shown) used for exchanging address, data and control signals, although other forms of component interconnections are possible. Finally, the system 100 can include devices for accepting computer-readable storage mediums (not shown) and can be interconnected with the network 105 for exchanging data and control signals transmitted as a computer data signal in a carrier wave.

In the described embodiment, each node 102–108 is a network connectable computer, such as a Sun SparcStation™ 5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash.

Figure 2:
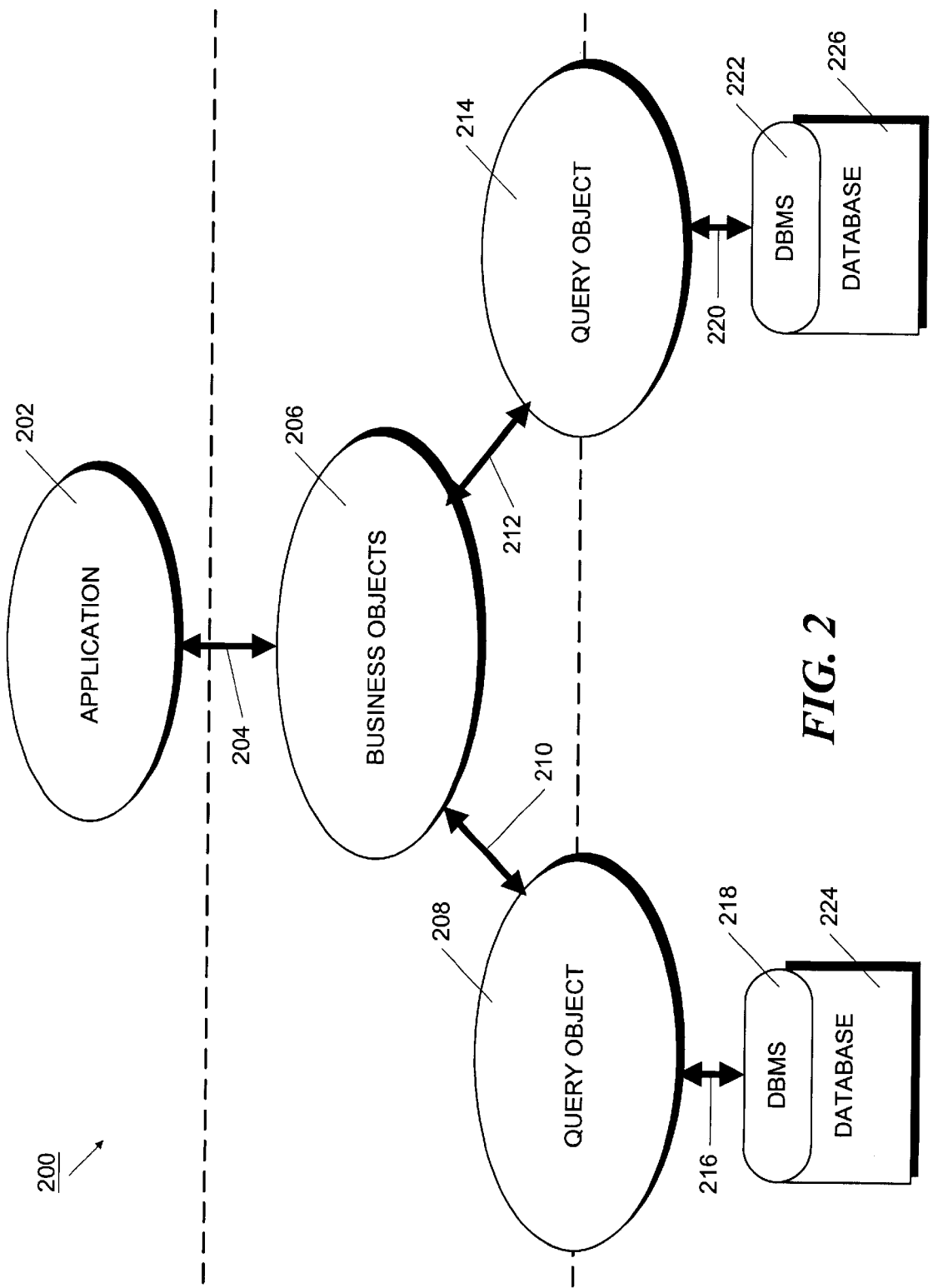
FIG. 2 is a block schematic diagram illustrating the interaction between client object, business objects and query objects in a three-tiered system.

Distributed computing environments can be logically viewed as of a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, itself use other software objects. Thus, an application in a distributed computing environment can consist of the combination of application-specific objects and the combined local and remote objects it uses. When one object calls an operation on another object, the calling object is referred to as the "client" while the called object is referred to as the "server." FIG. 2 is a block schematic diagram of a database client/server environment 200 using query objects 208 and 214 as might be implemented in the system 100 of FIG. 1. The environment 200 is functionally structured into three tiers. In the top tier 203, a client 102 (shown in FIG. 1) executes an application 202. The application 202 interacts, as indicated schematically by arrow 204, with business logic in the middle tier 205. The business logic is implemented as one or more business objects 206 (only one business object 206 is shown) and, in turn, interfaces with query objects 208 and 214. Both the business object 206 and the query objects 208 and 214 can be executed on either a client 102 or a server 108 (shown in FIG. 1). Other combinations and configurations of objects, including business object 206 or query object 208 and 214 are feasible.

In the bottom tier 207, a server 108 and an associated database 110 (shown in FIG. 1) include database management systems (DBMS systems) 218 and 222 (which may be executed on the server 108) along with associated databases 224 and 226, respectively. Query objects 208, 214 allow the business logic implemented in the iS business object 206 to access the DBMS systems 218, 222 without knowledge of the DBMS schema or query language.

More particularly, query objects 208, 214 are server objects that translate client requests into appropriate DBMS queries, issue those queries to the DBMS systems and return the results to the client. Functionally, each query object 208, 214 creates a logical "wrapper" that encapsulates a specific, application-dependent set of queries and provides the results to its clients as strongly typed values. Each query object 208, 214 is associated with a single DBMS system 218, 222, respectively, and has the capability of interacting with specific DBMS query APIs (represented by arrows 216 and 220) and parameters for the queries. However, the query object provides a DBMS-independent API (represented by arrows 210 and 212, respectively) to the business object 206 for accessing the databases 224, 226. Each query object also provides a mechanism for managing connections to the DBMS systems 218, 222 associated with the databases 224, 226, including methods for locating the databases 224, 226 in the distributed environment, methods for logging on to the DBMS systems 218, 222 and facilities for managing the connection resources. A query object may also provide multi-threading support, if necessary.

With a query object, accessing data in the databases 224 and 226 is analogous to calling a library routine. For example, a client of the query object 208, such as the business object 206, can perform the query by invoking a method in the query object passing in any parameters required by that method. The client also uses the API 210 to provide a result type that is known at the time the query object 208 is generated. The client gets back results as strongly typed values according to the mapping for the host language in which the client is written.365

The query objects 208, 214 encapsulate expertise about the underlying databases, including the DBMS specific query languages used, particular DBMS APIs, database schemas, handling of intermediate query results and a possibly non-trivial interpretation of results. Functionally, query objects 208, 214 translate domain-specific questions and operations into the appropriate DBMS-specific queries that manipulate the databases 224, 266 and provide results. The full power of each DBMS engine (not shown) is available, including its sorting and indexing techniques and query language processors and optimizers since the queries work directly on the databases 224, 226 themselves. Moreover, the query objects 208, 214 can utilize knowledge about the particular DBMS engine being used and any special optimization tricks.

Figure 3:
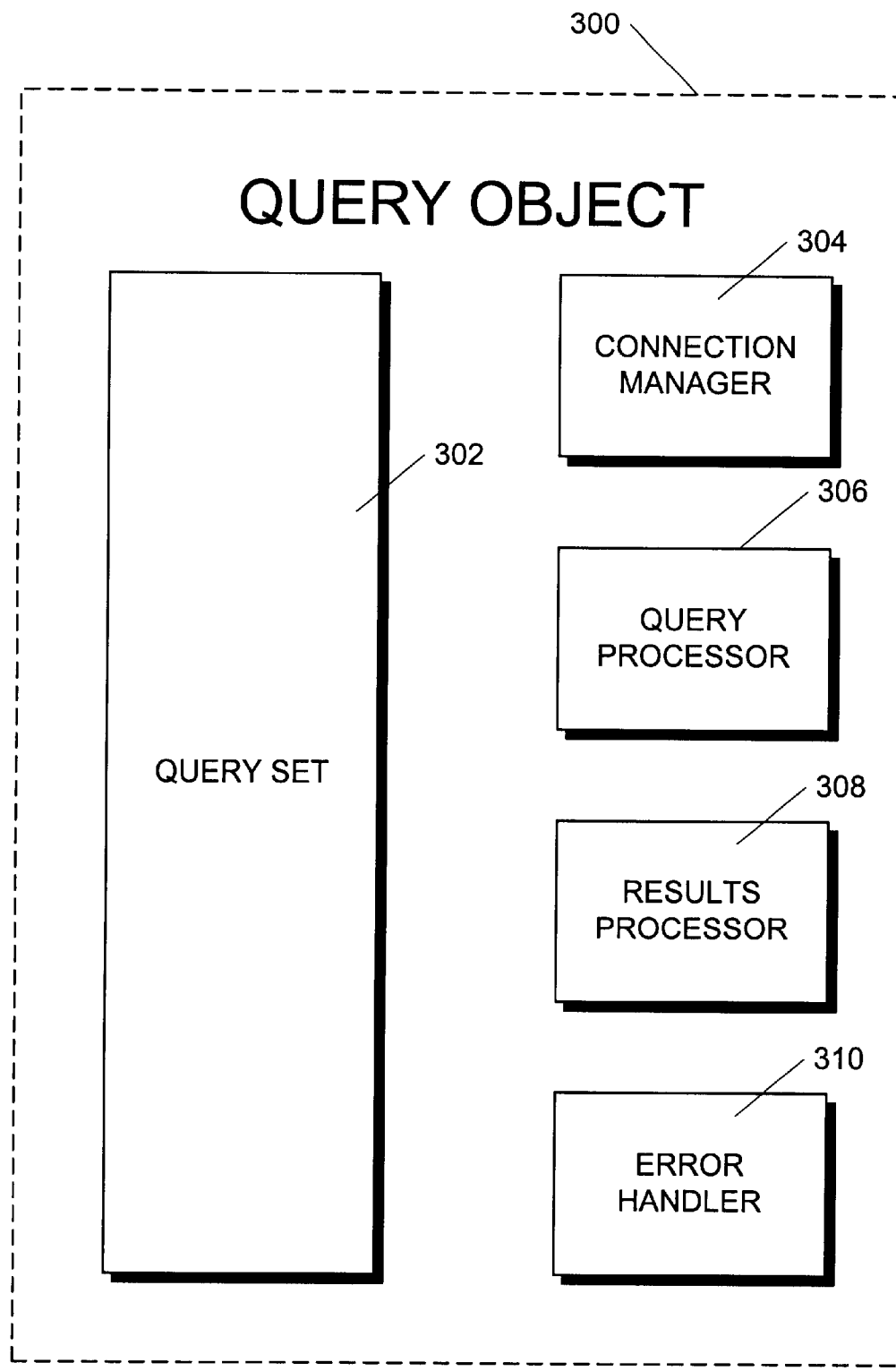
FIG. 3 is a block schematic diagram of the internal structure of a query object.

FIG. 3 is a block schematic diagram of one of the query objects 208 used in the database client/server environment 200 of FIG. 2. The query set 302 in query object 300 encapsulates a set of queries implemented in the query language. Each of the encapsulated queries conforms to the schema of the associated database 224 (shown in FIG. 2). A connection manager 304 handles the details of a connection between the query object 208 and the database 224 via the DBMS API 216. A query processor 306 performs one or more queries on the database 224 in response to a request from a client such as business object 206. A results processor 308 processes a set of the data received by the query object 300 in response to the queries and provides the resultant set as pre-determined data types to the client. An error handler 310 handles errors encountered by the connection manager 304 and the query processor 306 and communicates a pre-determined error message or indication to the client in the event of an error.

Figure 4:
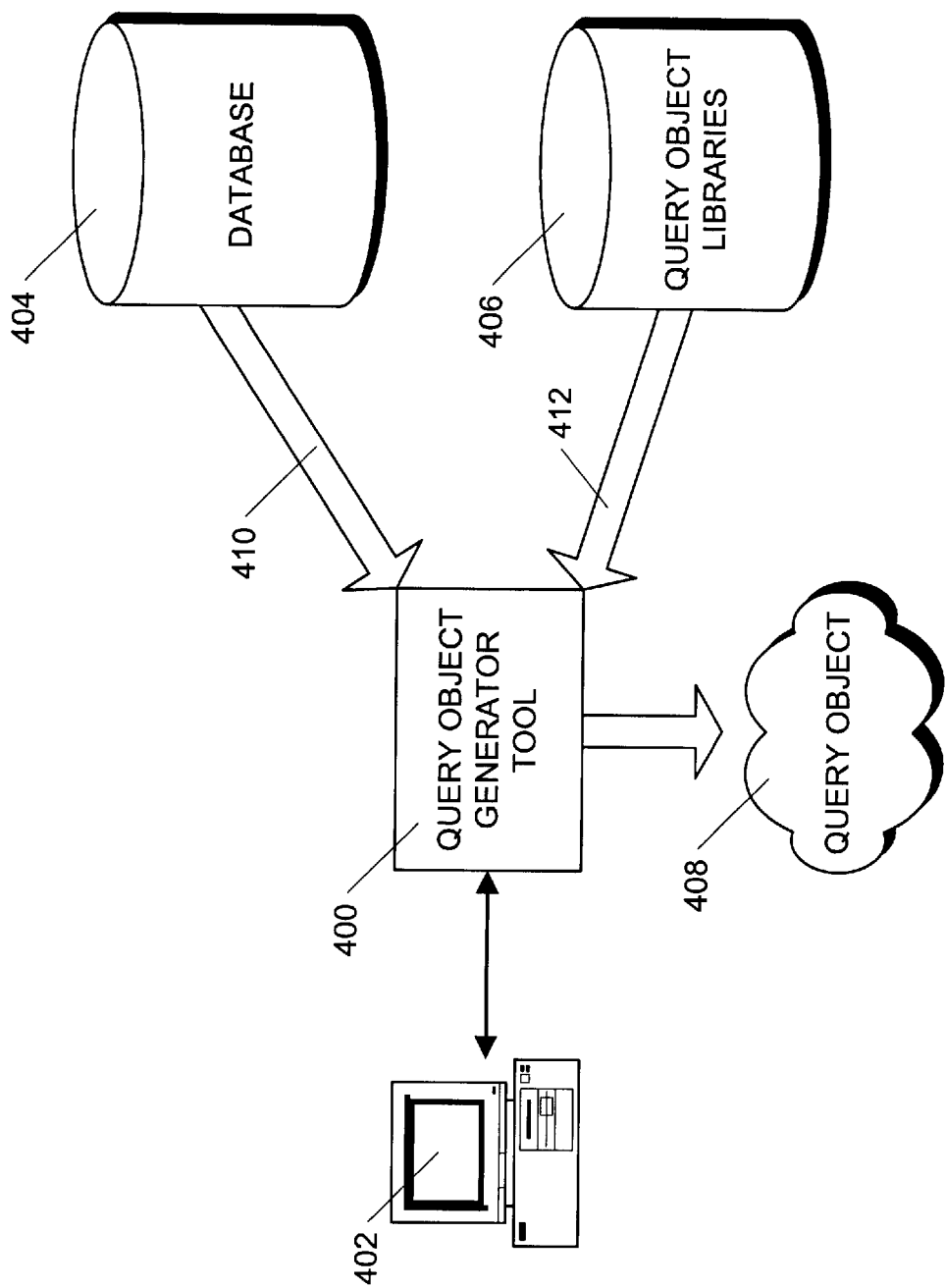
FIG. 4 illustrates the generation of a query object from information in the underlying database and query object library files.

FIG. 4 illustrates the operation of an inventive tool which generates the components of the query object illustrated in FIG. 3. In particular, the query object generator tool 400 utilizes information obtained from database 404 and query object libraries 406 to construct a query object 408. The query object generator tool 400 includes a mechanism (not shown) for obtaining the database schema from database 400 as indicated schematically by arrow 410. The database schema may be presented to a user by means of an optional GUI 402 to aid the user in formulating a query which is consistent with the database schema. When the query information has been obtained from the user, the query object generator tool 400 utilizes object-oriented class code found in the query object library 406 to instantiate code generator objects as indicated schematically by arrow 412. The code generator objects then generate the source code for the query object 408. The code generators may also generate build scripts which allow the query object 408 to be built from the generated source code.

In the preferred embodiment, the client/server environment 200 is implemented in compliance with the Common Object Request Broker Architecture (CORBA), such as described in "The Common Object Request Broker: Architecture and Specification," Rev. 2.0, Object Management Group, Inc. (July 1995), the disclosure of which is incorporated herein by reference. The application 202, business object 206 and query objects 208, 214 each export an API defined in Interface Definition Language (IDL) and interface with each other via an associated Object Request Broker (ORB) illustrated in FIG. 5. Each query object 208, 214 returns a set of IDL structures whose type is derived from the database schema at the time the query object 208, 214 is implemented. The query objects 208, 214 can interface with various data sources, for example, object databases, such as licensed by Versant, Inc. and Object Design, Inc.; relational databases, such as licensed by IBM (DB2), Oracle and Sybase; legacy data repositories via mechanisms and interfaces, such as IBM's MQ series and CICS; JDBC compliant databases (JDBC is a standard SQL database access interface); and ordinary flat files.

Figure 5:
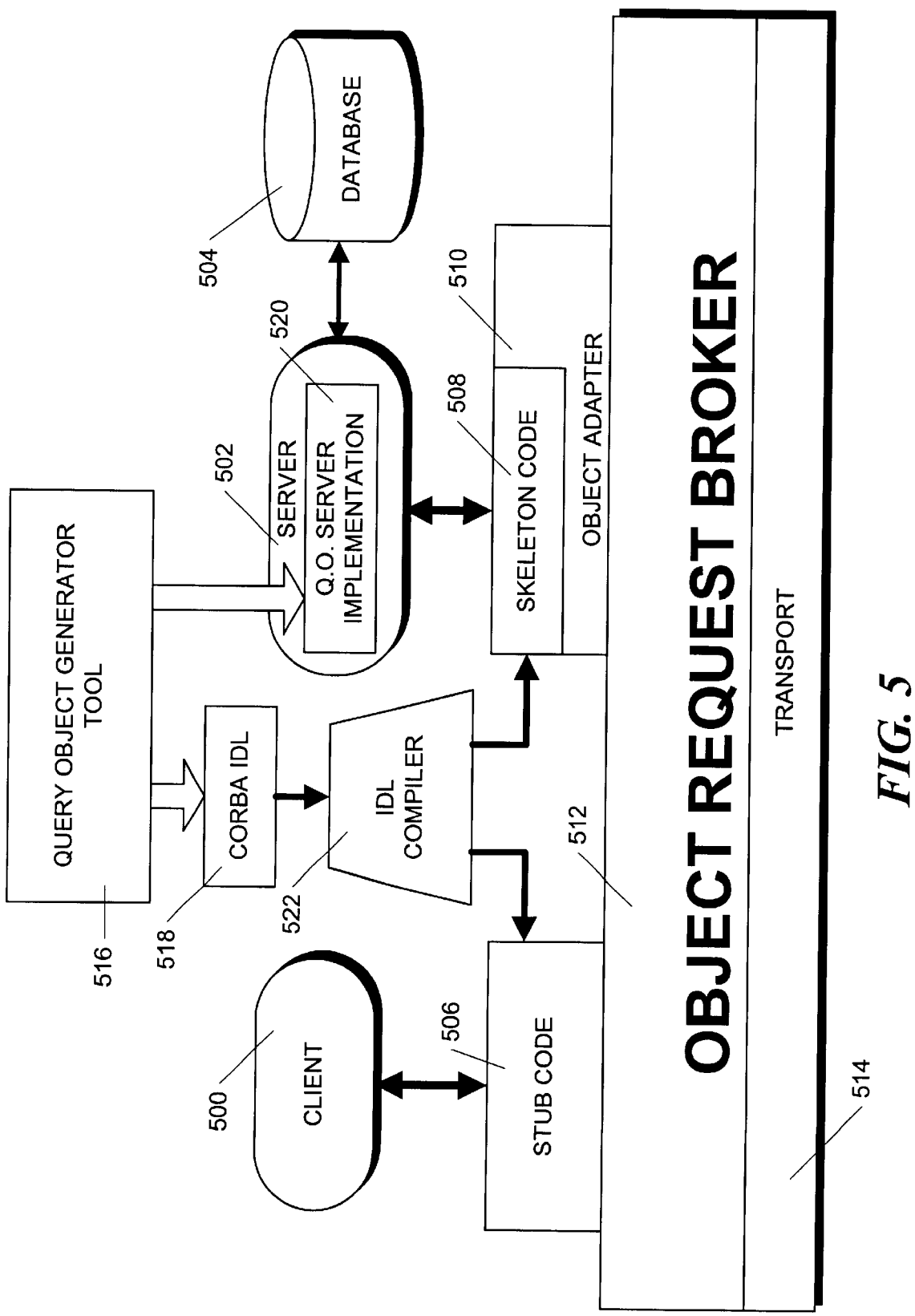
FIG. 5 illustrates how code generated by the inventive query object generator tool is used with a CORBA distributed object system.

FIG. 5 illustrates, in a very schematic form, the basic CORBA architecture which defines a peer-to-peer distributed computing facility where all applications are objects (in the sense of object orientation). In such a system, the client 500 communicates with the server 502 by means of an object request broker or ORB 512. an object, such as a query object can be located on the server 502. The ORB 512 operates with a transport 514 that conveys information between the client 500 and server 502. The client 500 communicates with the ORB 512 by means of the aforementioned IDL interface and a reference to the query object. The query object reference, in turn, contains an identification of the query object implementation 520 in the server 502 so that the server 502 can pass a request to the correct object implementation. The query object implementation 520 communicates with a database 504 to store and retrieve data in accordance with the requested query.

The entire CORBA architecture is actually implemented in a conventional programming language, such as C, C++, Smalltalk or JAVA. Implementations in a variety of languages are available from a number of vendors who typically provide a compiler, called an IDL compiler 522, bundled with their ORB products. The compiler 522 generates header files which define the OMG IDL interfaces and can be incorporated into application programs. The compilers also generate the client stub code 506 and the server skeleton code 508 for each interface.

The client 500, which may be a business object (206, FIG. 2) can directly link to the OMG IDL stub code 506. As far as the client is concerned, an invocation of the stub code 506 appears to be a local function call. Once invoked, the stub code 506 provides an interface to the ORB 512 that encodes the operation's parameters into communication formats suitable for transmission on the transport 514 to the server 502. The stub code then transmits a request for service to the server 502.

At the server side, the OMG IDL skeleton code 508 is the corresponding implementation of the OMG IDL interface. When the ORB 512 receives a request, the skeleton code 508 decodes the request parameters and generates a call to the query object implementation 520 in the server 502. When the server completes processing of the request, the skeleton code 508 and stub code 506 return the results to the client 500. If an error has occurred, exception information generated by the server or by the ORB is returned. An object adapter 510 comprises the interface between the ORB 512, the skeleton code 508 and the server 520. Object adapters, such as adapter 510, support functions, such as registration of object implementations and activation of servers.

The inventive query object generator tool preferably generates a query object for use with a conventional CORBA system such as that illustrated in FIG. 5. When operating with such a CORBA system, the query object generator tool 516 generates CORBA IDL interface code 518. This IDL code is applied to a conventional IDL compiler 522 which, in turn, generates the client stub code 506 and the server skeleton 508.

As an illustration, assume that a query object (named "ZZZ") includes a query such as the following SQL query:

SELECT *

FROM Sales

WHERE product like: product

This is a parameterized query which selects records from a "Sales" table for which a field value "product" equals the value of the parameter :product. It returns results in the form of a product name, number of product units in a calendar quarter, Dand the relevant quarters. An example of the IDL code generated by the query object generator tool 516 is illustrated in the following code snippet:

```
//ZZZ/ZZZ.idl—IDL interface for ZZZ Query Object
//
//Generated by Query Generator tool version 0.3 on Mon
    Aug 04 19:17:23 PDT 1997
//Query object ZZZ saved in file zzz.qo
//
    //#pragma prefix "GOLD"
#include "QueryObject.idl"
module ZZZ {
    //Result structs and sequences
    struct sel_struct {
        string product; //VARCHAR(32)
        float numberOfUnits; //FLOAT (15)
        string quarter; //VARCHAR(2)
    };
    typedef sequence<sel_struct>sel_structs;
    //Wrapper operations
    interface ZZZInterface {
        sel_structs sel (
            in QueryObject::ConnectionInfo connectionInfo,
            in string product
        raises (QueryObject::ConnectionError,
            QueryObject::ErrorDuringQuery);
    };
};
```

In addition, the query object generator tool 516 generates source code for the server implementation of the query object 520 in the program language used in the CORBA system.

The CORBA IDL code 518 is written in standard IDL language. However, the CORBA server implementation 520 must be written in a language used on the server hi 502. This may, for example, be C++ or Java or some other language which is suitable for implementation on server 502. A code snippet illustrating implementation source code for the ZZZ query object appears as follows. This source code has been written in JAVA for a JDBC compliant database. Note that the SQL parameterized statement "WHERE product like :product" has been automatically replaced by the JDBC notation "WHERE product like ?". The code snippet has been edited to remove conventional details of exception catching and connection management which are also generated by the inventive query object tool:

```
///ZZZ/ZZZInterfaceImpl.java—Java implementation for
    query object:ZZZ
//
//Generated by Query Generator Tool version 0.3 on Mon
    Aug 4 19:17:23 PDT 1997
import java.util.*;
import org.omg.CORBA.*;
import org.omg.CosNaming.*;
import org.omg.CosNaming.NamingContextPackage.*;
import QueryObject.*;
import GOLD.QoLib.*:
import java.sql.*;
//NOTE: The code in this file doesn't depend on ZZZ/
    ZZZServer.java
//so it can be moved to a new server, or added to an applet.
//The servant object
public class ZZZInterfaceImpl extends_
    ZZZInterfaceImplBase {
public sel_struct[ ]sel(
    ConnectionInfo connectionInfo,
    String product_in)
throws ConnectionError, ErrorDuringQuery
{
    . . .
    String sqlstring="select * from Sales where product
        like?";
    . . .
    //Prepare the query string
    stmt=conHandle.getConnection( ).prepareCall
        (sqlString);
    //Set the input variables and execute the query
    stmt.setString (1, product_in);
    stmt.execute ( );
    rs=stmt.getResultSet( );
    //Collect the result rows
    try {
        tempResult=new Vector (10, 1000);
        while (rs.next( )){
            sel_struct row;
            //Assign each result column to a Java variable
            String product_out=rs.getString (1).trim ( );
            float numberOfUnits_out=rs.getFloat(2);
            String quarter_out=rs.getString(3).trim( );
            //Create an object for each row
            row=new sel_struct (
                product_out,
                numberOfUnits_out,
                quarter out):
            tempResult.addElement (row);
        }
        result=new sel_struct [tempResult.size( )];
        for (int i=0; i<tempResult.size( ); i++){
        result[i]=(sel_struct) tempResult.elementAt (i);
        }
    }
    catch (SQLException ex){
        . . .
    }
    //Close the result set
    rs.close( );
    //Close the statement
    stmt.close( );
    . . .
```

```
    . . .
    return result;
    }
}
```

Figure 6:
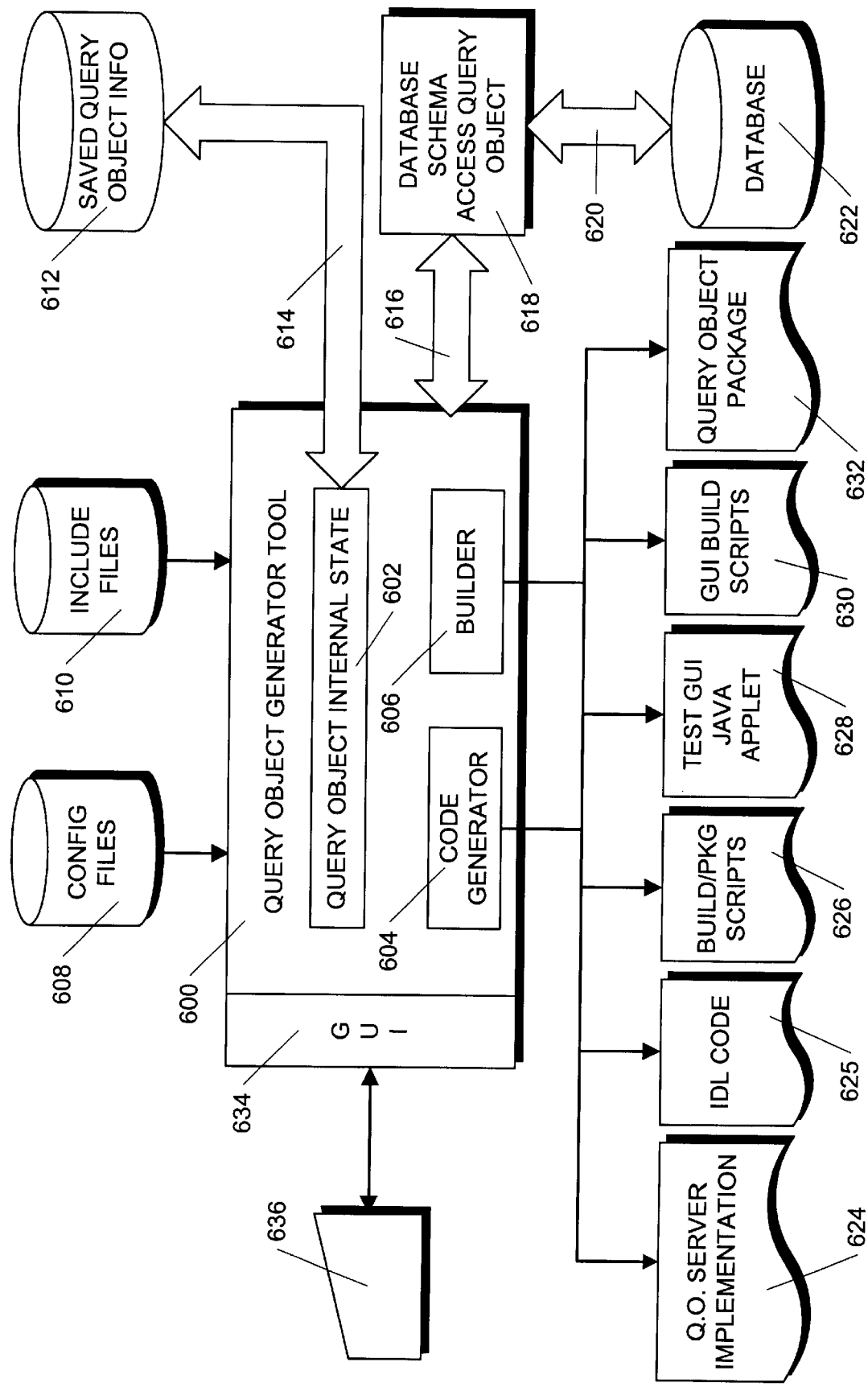
FIG. 6 illustrates the internal architecture of the inventive query object generator tool.

The internal architecture of the query object generator tool is illustrated in block schematic diagram form in FIG. 6. The query object generator tool 600 comprises a query object internal state object 602, code generator object 604 and a builder object 606. The query object internal state object 602 allows the user to save a logical definition of a query object in an intermediate file, such as file 612. In particular, object 602 can store and retrieve file information in file 612 as indicated schematically by arrow 614. The information saved in file 612 is not the entire query object but is sufficient amount of information to be able to reconstruct the query object. This allows the user to open an existing query object for modification without having to restart from the beginning. An example of the information saved for the ZZ7 query object would be the following:

```
//Query Object Intermediate File ZZZ.qo
iff_version=1
repository_prefix="GOLD"
base_name="ZZZ"
#source_db=
database_name="idbc:odbc:N_America"
user_name="sa"
#impl_opts=
access style="transient private"
tx_style="transaction per call"
dbms_api="JDBC"
idl_file="ZZZ/ZZZ.idl"
impl_dir="ZZZ"
test_dir="ZZZGUI"
#queries [1]={
Query sel="select *\
from Sales\
where product like: product"
input-parameters [1]={
    product "VARCHAR"
}
result_struct=getit_struct {
    product "VARCHAR"32 0 0,
    numberOfUnits "FLOAT"15 0 0,
    quarter "VARCHAR"2 0 0
}
```

The query object internal state object 602 is actually a collection of objects (illustrated in FIG. 7) which model input parameters, result structures and various implementation options. The query object generator tool 600 may optionally include a graphic user interface 634 which enables a user, at terminal 636, to operate interactively with the generator tool 600.

Generator tool 600 also receives information from the database 622 in order to allow the user to formulate the query and test the query. Extracting information from the database 622 can be performed in several manners. Preferably, generator tool 600 uses a special query object called a "database schema access query object" 618 to retrieve the schema of the underlying database 622 as indicated schematically by arrow 620. The database schema access query object 618 is essentially a special query object which generates a query to the database 622. However, instead of retrieving data, the query retrieves "metadata" which might include, for example, the names of database tables and database stored procedures in the database 622 and their descriptions, including such information as column names and types for tables and input and output parameter types for stored procedures. The schema information is returned to generator tool 600 as indicated by arrow 616 and may be presented graphically to the user by means of the GUI 634 on terminal 636. The schema information assists the user in formulating a query.

The generator 600 also receives input information from the configuration file 608 and include files 610. The tool 600 reads the configuration files 608 when it starts up. is These files tell the tool 600 about the environment in which it is running and they include such information as the JDBC drivers that are available and the location of various software programs. The configuration files also contain the name of the include directory 610 which contains various "boilerplate" files. When the tool 600 starts up, it first tries to read the configuration file in a directory that is "hard coded" into the tool. If the configuration file is not found, the tool then looks for a configuration file in the user's home directory. If the file is still not found, the tool looks in the current directory.

Generator tool 600 may further receive query strings and parameter information from the user, via terminal 636. After the input information has been received, the query object generator tool 600 utilizes an appropriately selected code generator 604 to generate the source code which implements the query object. In particular, the code generator 604 generates the query object server implementation 624 and the query object ID code 625. In addition, the tool 600 may also generate build and package scripts 626 which can be used to build the query object from the source code 624 and the IDL code 625. The source code and the build scripts are provided to a builder object 606 which generates the final query object package 632 that can be installed on a CORBA server. As previously described, the query object IDL interface code 625 is provided to a conventional IDL compiler to generate the client stub code and server skeleton code.

Optionally, code generator object 604 may also generate source code 628 which can be used to construct a test interface Java applet. The applet, in turn, generates a graphic user interface in order to test the generated query object. The code generator object 604 may further generate build scripts 630 which can be used to build the test interface for testing the generated query object.

Figure 7:
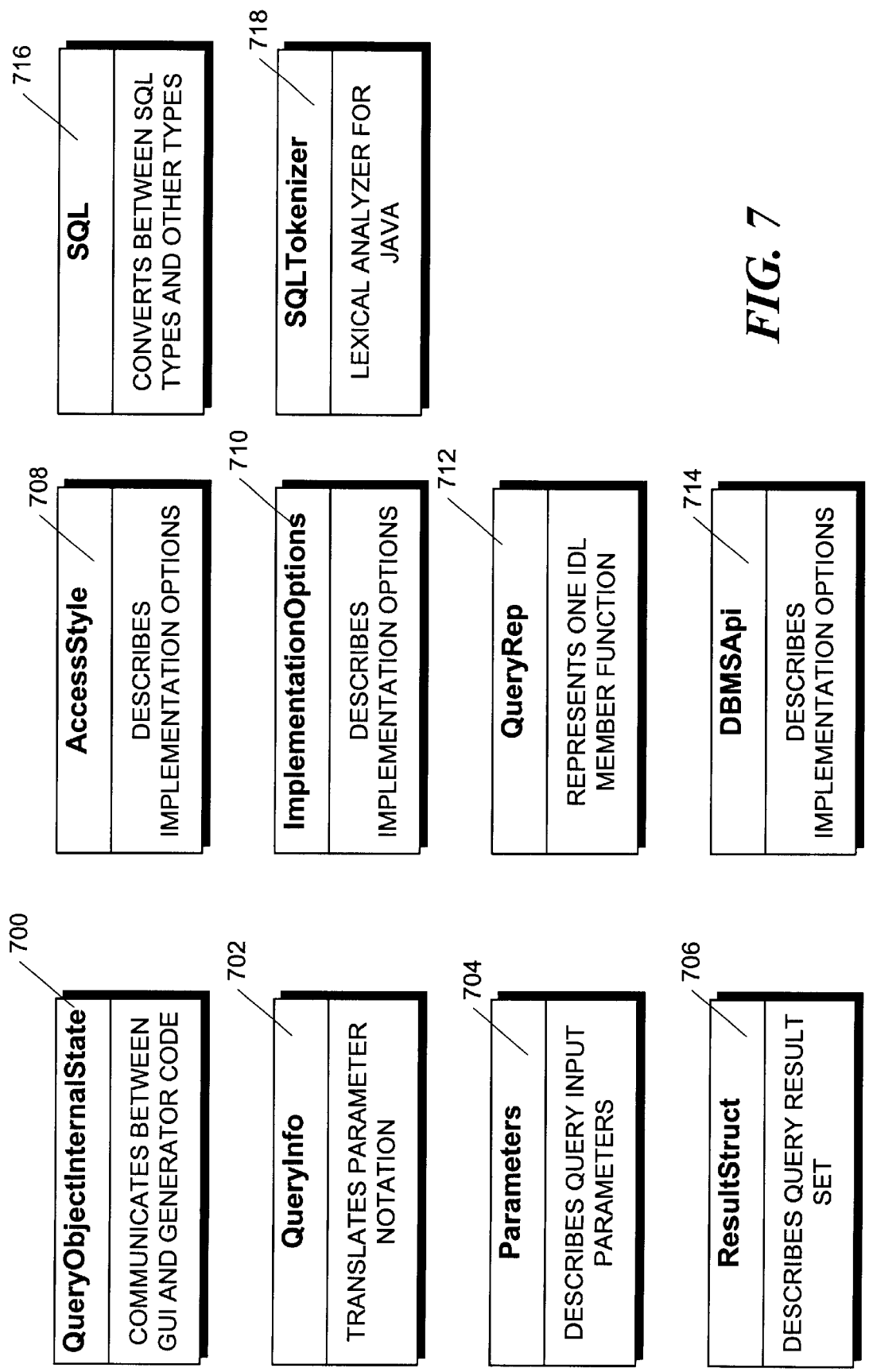
FIG. 7 shows various classes which generate objects that are used in the inventive query object generator tool.

FIG. 7 illustrates the classes which are part of the query object internal state 602 of query object generator tool 600. These classes include a QueryObjectInternalState class 700 from which an object can be instantiated, which object communicates between the user GUI and the generator code. A QueryInfo class 702 is also included which contains methods that translate parameter notations between a notation entered by the user and the notation actually used by the underlying database. For example, parameters in a query written in accordance with SQL language usually use a colon (:) to designate a parameter whereas a JDBC database driver expects a question mark (?) to designate a parameter. The QueryInfo class 702 contains methods that translate between these two notations.

A Parameters class 704 defines data structures that describe the query input parameters. The ResultStruct class 706 defines data structures that describe the query result set.

An AccessStyle class 708 is also provided. It contains information that describes implementation options. Implementation options are also described in the ImplementationOptions class 710 and the DBMSApi class 714.

A QueryRep class 712 contains data and methods that represent one IDL member function. Two helper classes are also provided. These are the SQL class 716 and the SQL Tokenizer class 718. The SQL class 716 provides methods and lookup tables that convert between data types such as integers, floating point representations and boolean values used in one query language to the equivalent data types used in the underlying database query language. The SQLTokenizer class 718 contains methods which lexically analyze the input text string to extract the various parameters and commands.

Figure 8:
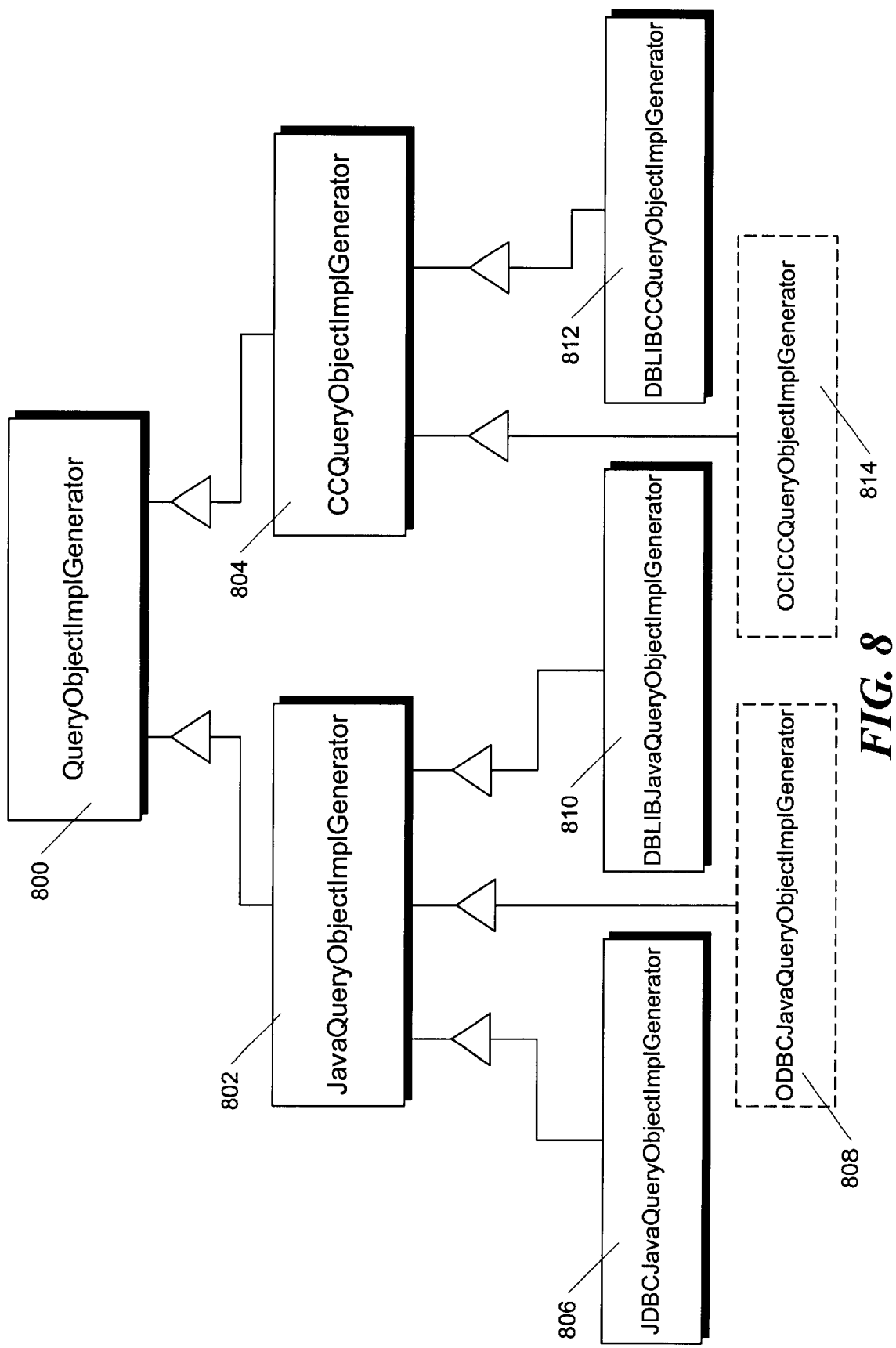
FIG. 8 is a class hierarchy diagram which illustrates the class structure of the code generator classes.

The class structure of the code generators is shown in FIG. 8. The code generator object which is actually used to generate specific query object source code must generate code which is compatible with the underlying database and is also written in the implementation language which is used to implement the CORBA server. Accordingly, the code generator classes are arranged in a class hierarchy with subclasses that depend on the implementation language and the underlying DBMS language.

More specifically, the QueryObjectimplGenerator class 800 is a portable base class which can be used with any implementation language, any CORBA platform and any database. A method in this class instantiates an instance of an appropriate subclass which is a specific implementation class that generates code for a specific implementation language, for example, C++, or Java, and a specific database API, for example, Sybase DBlib. The subclass is selected based on configuration information in the QueryObjectInternalState object discussed above. The method (find_generator) has the following form:

```
public QueryObjectImplGenerator find_generator
    (QueryObjectInternalState qois)
{
    switch(qois.impl opts.dbms api.dbms api_code){
    case DbmsApi.sybase dblib:
        return new DblibCCQueryObjectImplGenerator(qois);
    case DbmsApi.jdbc:
        return new JdbcJavaQueryObjectImplGenerator(qois);
    case DbmsApi.sybase_ctlib:
        return new CtlibJavaQueryObjectImplGenerator(qois);
    case DbmsApi.oracle_pro_c:
        return new ProcCCQueryObjectImplGenerator(qois);
    case DbmsApi.oracle_oci:
        return new OciCCQueryObjectImplGenerator(qois);
    case DbmsApi.objectstore:
        return new ObjectstoreJavaQueryObjectImplGenerator
            (qois);
    default:
        throw new RuntimeException(No generator is implemented for "+qois.impl_opts.dbms_api);
    }
}
```

In addition, the QueryObjectImplGenerator class 800 includes methods for generating the IDL interface for the query object and accompanying comments, a method for copying GUI files for the test GUI, a method for generating a test script file, a method for generating a test client and a method for generating the source code for test GUI. Further, the QueryObjectImplGenerator class 800 also contains a RunServer process and a RunTestGUI process which installs a query object in the server, starts the server and also sets up a test GUI to test the query object.

As previously mentioned, the QueryObjectImplGenerator class 800 can have a number of subclasses, each of which is tailored for a specific implementation language. Two such subclasses are shown in FIG. 8. These include the JavaQueryObjectImplGenerator class 802 and the CCQueryObjectImplGenerator class 804. Each of these subclasses is tailored for a particular implementation language. For example, the JavaQueryObjectImplGenerator class 802 contains common logic for all database APIs, but tailored for a JAVA implementation. The constructor of this class creates files for the source code and build scripts with file names based on a parameter in the QueryObjectGeneratorInternalState object. The JavaQueryObjectImplGenerator class 802 includes methods for copying the tool configuration and include files, methods for generating the query object implementation file, methods for generating the build script file and generating the server start and configuration files.

Each of the subclasses 802 and 804 may have further subclasses which are used with a particular DBMS API. For example, the JavaQueryObjectImplGenerator class 802 may have two, or more, subclasses, 808 and 810.

The JDBCJavaQueryObjectImplGenerator class 806 is a concrete class which is used for a JAVA implementation with a JDBC database driver API set. Similarly, the DBLIBJavaQueryObjectImplGenerator class 810 is utilized for Java implementations that operate with a Sybase DBLib API set.

Other DBMS APIs may also be accommodated by adding new subclasses to the class hierarchy as indicated schematically by dotted class 808 (ODBCJavaQueryObjectImplGenerator). Each database that is added requires a separate subclass with a specific DBMS API interface.

In a like manner, the C++ query object implementation generator class 804 may be subclassed to generate code for operation with a particular database API. For example, DBLIBCCQueryObjectImplGenerator class 812 is useful with a Sybase DBLib API set. The class hierarchy may be extended by generating other classes such as OCICCQueryObjectImplGenerator class 814 for other database APIs used with a C++ implementation. By instantiating an appropriate subclass, a query object can be tailored to both the implementation language and the database API set.

The code generation mechanism used in code generator methods is a "template" model in which source code text lines are generated by print statements to an output file. The output file is then compiled and built to generate the complete class file. Most of the generated source file consists of "boiler plate" which is determined in advance. This boilerplate code includes file headers, comments and common code. Some of the source code, however, depends on the actual number of queries in the query structure. In these areas code loops are used to generate the variable code lines.

The query object implementation code is generated by methods found in a subclass that is specific to the DBMS API set. For example, the implementation constructing method in the JavaQueryObjectImplGenerator class 802 might call a specific method in a JDBCJavaQueryObjectImplGenerator class 806. The following code snippet is an example of a template model code generator for SELECT query in the ZZZ query object described above. The Indent and Outdent methods contained in the "ind" formatting object are utility routines that help in formatting the resulting source code:

```
public void generateBackendSpecificOperation(PrintStream ps, Indent ind,QueryRep q)
{
    String base=int_state.base_name;
    SelectQuery sq=(SelectQuery) q;
    String struct=sq.result_struct.struct_name;
    //Caller does function signature and {
    //Declare local variable for the result set, etc.
    ps.println(ind+"ResultSet rs=null;");
    ps.println(ind+"PreparedStatement stmt=null;");
    ps.println(ind+"ConnectionHandle conHandle=null;");
    ps.println(ind+"String sqlString="+
        Java_quote(sq.query_info.jdbc_query)+";");
    ps.println(ind+"Vector tempResult=null;");
    ps.println(ind+struct+"results=null;");
    ps.println(ind+"boolean reTry=true;");
    ps.println(ind+"int retryCount=0;");
    ps.println( );
    ps.println(ind+"QORuntime.initUrl(connectionInfo,
        defaultUrl);");
    ps.println( );
    ps.println(ind+"//Code to get the connection");
    ps.println(ind+"do {");
    ind.indent( );
    ps.println(ind+"try {");
    ind.indent( );
    ps.println(ind+"conHandle="+
        "getConnectionManager( ).getConnectionHandle
        (connectionInfo);");
    ind.outdent( );
    ps.println(ind+"} catch (ConnectionError ex){");
    ind.indent( );
    ps.println(ind+"if (retryCount<getConnectionManager(
        ).getMaxRetries( )){");
    ind.indent( );
    ps.println(ind+"retryCount++;");
    ps.println(ind+"continue;");
    ind.outdent( );
    ps.println(ind+"}");
    ps.println(ind+"else");
    ps.println(ind+"throw ex;");
    ind.outdent( );
    ps.println(ind+"}");
    ps.println( );
    ps.println(ind+"//Prepare the query string");
    ps.println(ind+"try {");
    ind.indent( );
    ps.println(ind+"stmt=conHandle.getConnection(
        ).prepareStatement(sqlString);");
    ind.outdent( );
    ps.println(ind+"} catch (SQLException ex){");
    ind.indent( );
    ps.println(ind+"getConnectionManager(
        ).releaseAfterException(conHandle);");
    ps.println(ind+"if (retryCount<getConnectionManager(
        ).getMaxRetries( )){");
    ind.indent( );
    ps. println(ind+"retryCount++;");
    ps.println(ind+"continue;");
    ind.outdent( );
    ps.println(ind+"}");
    ps.println(ind+"else");
    ps.println(ind+"throw new ErrorDuringQuery
        (ex.getErrorCode( ),
    ex.getMessage( ));");
    ind.outdent( );
    ps.println(ind+"}");
```

```
ps.println( );
ps.println(ind+"//Set the input variables and execute the
    query");
ps.println(ind+"try {");
ind.indent( );
//iterate over the input variables . . .
for (int i=0; i<sq.nInputParameters; i++){
    Parameter ip=sq.getInputParameter(i);
    ps.println(ind+"stmt."+input_var_set(ip)+
    "("+(i+1)+","+ip.param_name+"_in);");
}
ps.println( );
ps.println(ind+"stmt.executeo;");
ps.println(ind+"rs=stmt.getResultSet( );");
ind.outdent( );
ps.println(ind+"} catch (SQLException ex){");
ind.indent( );
ps.println(ind+"try {stmt.close( );} catch (SQLException
    e){ }");
ps.println(ind+"getConnectionManager( ).
    releaseAfterException(conHandle);");
ps.println(ind+"if (retryCount<getConnectionManager(
    ).getMaxRetries( )){");
ind.indent( );
ps.println(ind+"retryCount++;");
ps.println(ind+"continue;");
ind.outdent( );
ps.println(ind+"}");
ps.println(ind+"else");
ps.println(ind+"throw new ErrorDuringQuery
    (ex.getErrorCode( ),
ex.getMessage( ));");
ind.outdent( );
ps.println(ind+"}");
ps.println(ind+"reTry=false;");
ind.outdent( );
ps.println(ind+"} while (reTry);");
ps.println( );
ps.println(ind+"//Collect the result rows");
ps.println(ind+"try {");
ind.indent( );
ps.println(ind+"tempResult=new Vector(10, 1000);");
ps.println(ind+"while (rs.next( )){");
ind.indent( );
ps.println(ind+struct+"row;"); //Sales_row row
ps.println( );
ps.println(ind+"//Assign each result column to a Java
    variable");
//Declare Java variables for the output struct columns
for (int i=0; i<sq.result_struct.parameters.size( ); i++){
    Parameter param=sq.result_struct.parameters.element
        (i);
    ps.println(ind+output_var_get(i+1,param));
}
ps.println( );
ps.println(ind+"//Create an object for each row");
ps.println(ind+"row=new"+struct+"(");
ind.indent(10+struct.length( ));
//Pass each output struct column to the constructor. This
    is complicated
//by the fact that the constructor parameters have IDL
    types, not Java
//types, so we have to do the correct type conversion
    where the two do not
//match.
for (int i=0; i<sq.result_struct.parameters.size( ); i++){
    Parameter param=sq.result_struct.parameters.element
        (i);
    ps.print(ind+output_var_to_idl(param));
    ps.println((i<sq.result_struct.parameters.size( )-1)?",
        ":");");
}
ind.outdent(10+struct.length( ));
ps.println(ind+"tempResult.addElement(row);");
ind.outdent( );
ps.println(ind+"}");
ps.println( );
ps.println(ind+"result=new" +struct+"[tempResult.size(
    )];");
ps.println(ind+"for (int i=0; i<tempResult.size; i++){");
ind.indent( );
ps.println(ind+"result[i]=("+struct+")
    tempResult.elementAt(i);");
ind.outdent( );
ps.println(ind+"}");
ind.outdent( );
ps.println(ind+"}");
ps.println(ind+"catch (SQLException ex){");
ind.indent( );
ps.println(ind+"try {rs.close( );} catch (SQLException
    e){ }");
ps.println(ind+"try {stmt.closeo( );} catch
    (SQLException e){ }");
ps.println(ind+"getConnectionManager(
    ).releaseAfterException(conHandle);");
ps.println(ind+"throw new ErrorDuringQuery
    (ex.getErrorCode( ),
ex.getMessage( ));");
ind.outdent( );
ps.println(ind+"}");
ps.println( );
ps.println(ind+"//Close the result set");
ps.println(ind+"try {rs.close( );}");
ps.println(ind+"catch (SQLException ex){");
ind.indent( );
ps.println(ind+"try {stmt.close( );} catch (SQLException
    e){ }";
ps.println(ind+"getConnectionManager(
    ).releaseAfterException(conHandle);");
ps.println(ind+"return result;");
ind.outdent( );
ps.println(ind+"}");
ps.println( );
ps.println(ind+"//Close the statement");
ps.println(ind+"try {stmt.close( );}");
ps.println(ind+"catch (SQLException ex){";
ind.indent( );
```

```
ps. println(ind+"getConnectionManager(
    ").releaseAfterException(conHandle);");
ps.println(ind+"return result;");
ind.outdent( );
ps.println(ind+"}");
ps.println( );
ps.println(ind+"//Release the connection");
ps.println(ind+"getConnectionManager(
    ").releaseConnectionHandle(conHandle);");
ps.println( );
ps.println(ind+"return result;");
//Caller does function}
    }
}
```

Note that most of the code consists of "boiler plate" statements which are generated by fixed print output statements. However, portions of the code are code loops that generate code lines for each separate query in the query object.

Figure 9:
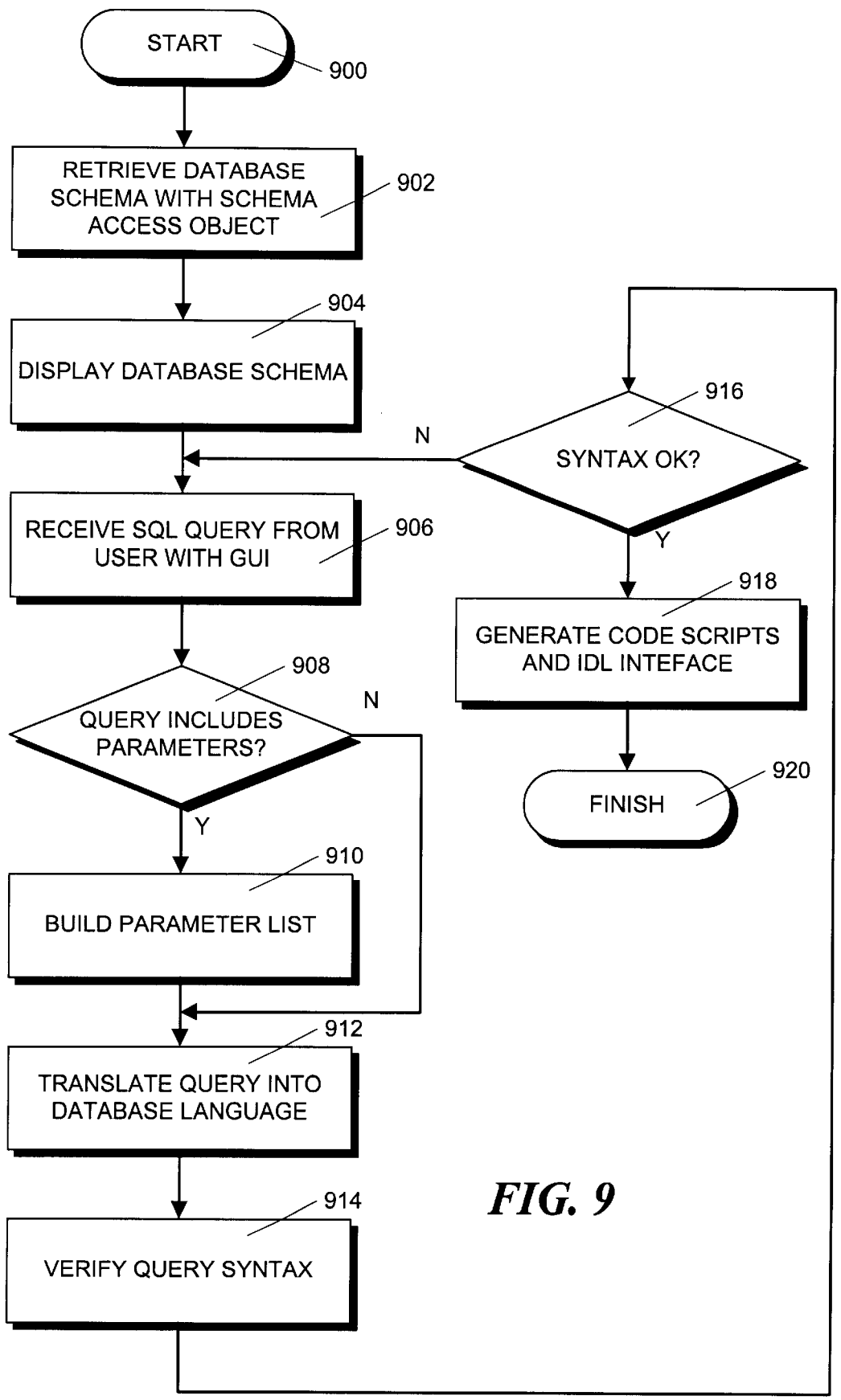
FIG. 9 is a flowchart illustrating the steps involved in generating a query object using the inventive query object generator tool.

The general sequence of steps carried out by the inventive query object generator tool in order to generate the source code for a query object are illustrated in FIG. 9. The illustrative routine starts with step 900 and proceeds with step 902 where the database schema are retrieved, for example, with a schema access query object as previously mentioned.

Once the database schema have been retrieved in step 902, they are displayed to the user in step 904. This may be accomplished, for example, with the GUI portion of the query object generator tool. The user then uses the database schema to formulate a query expressed as a text string using SQL statements or another format. The SQL query text string may be, for example, be entered into the generator tool by means of the GUI as set forth in step 906.

In step 908, the query text string is parsed, for example, using the SQLTokenizer object (716, FIG. 7) previously described in order to determine whether the query includes parameters. If not, the routine proceeds to step 912. Alternatively, if the query does include parameters, the routine proceeds to step 910 where a parameter list is built. The details of parameter list construction are disclosed in FIG. 10 and the accompanying description thereof.

In either case, the routine ends up at step 912 where the query commands entered by the user are translated into DBMS specific query language commands. This is generally accomplished by using lookup tables to translate specific commands from the input SQL language to the output DBMS specific language.

Next, in step 914, the translated query syntax is verified. This can be accomplished in a number of ways. For example, the aforementioned database schema access query object can be used to verify the validity of the translated query syntax by applying the query to the underlying DBMS engine. In some cases, the underlying DBMS API may provide a "verify" function which can be invoked to verify if the syntax of the query is correct. In other cases, the execution of a "prepare query" statement may cause the DBMS engine to verify the query. In other cases, the query may actually have to be submitted to the database. In the case of UPDATE or DELETE queries, a rollback operation may then have to be performed to "undo" the operation of the query, should it succeed.

In any case, the routine proceeds to step 916 where a determination is made whether the translated query syntax is proper or not. If the syntax is not proper, the routine returns to step 906, possibly generating an error message, to indicate the user that the query is improper and must be rewritten.

Figure 11A:
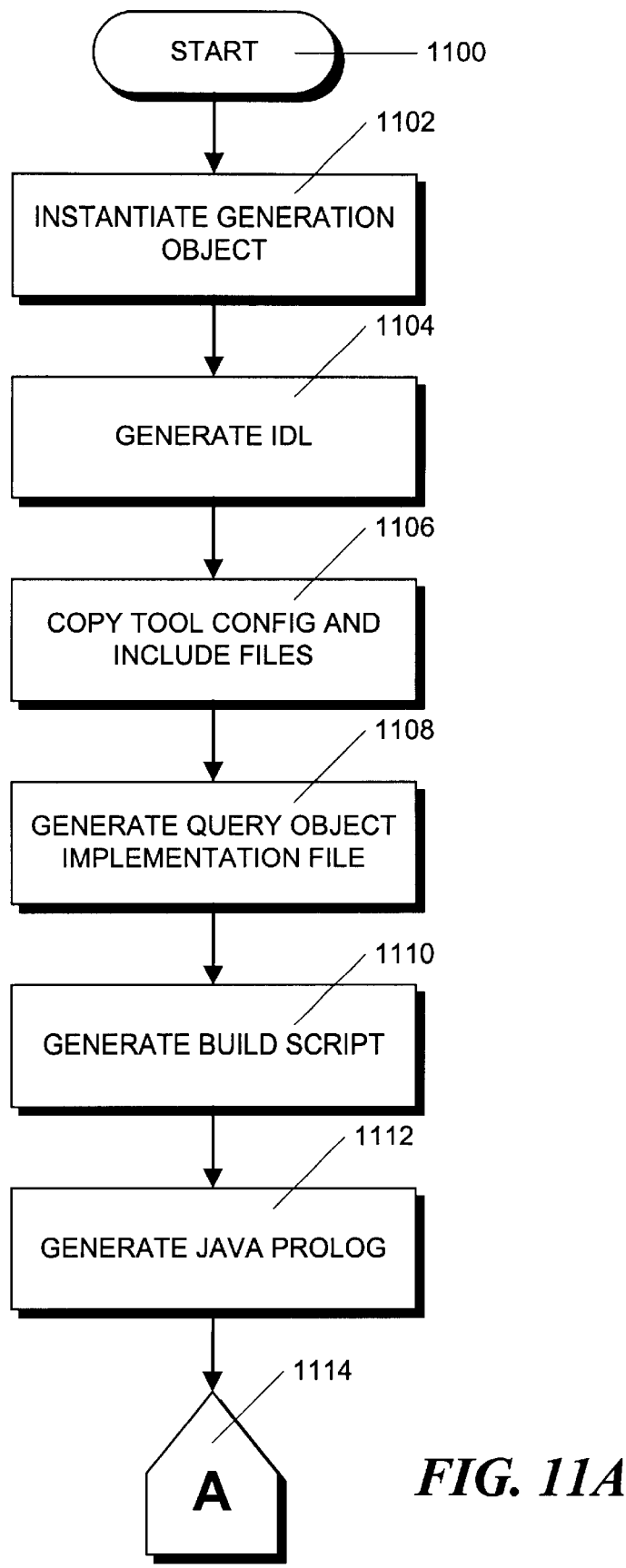
FIGS. 11A and 11B, when placed together, form a flowchart illustrating the operation of a code generator during the generation of a query object.
Figure 11B:
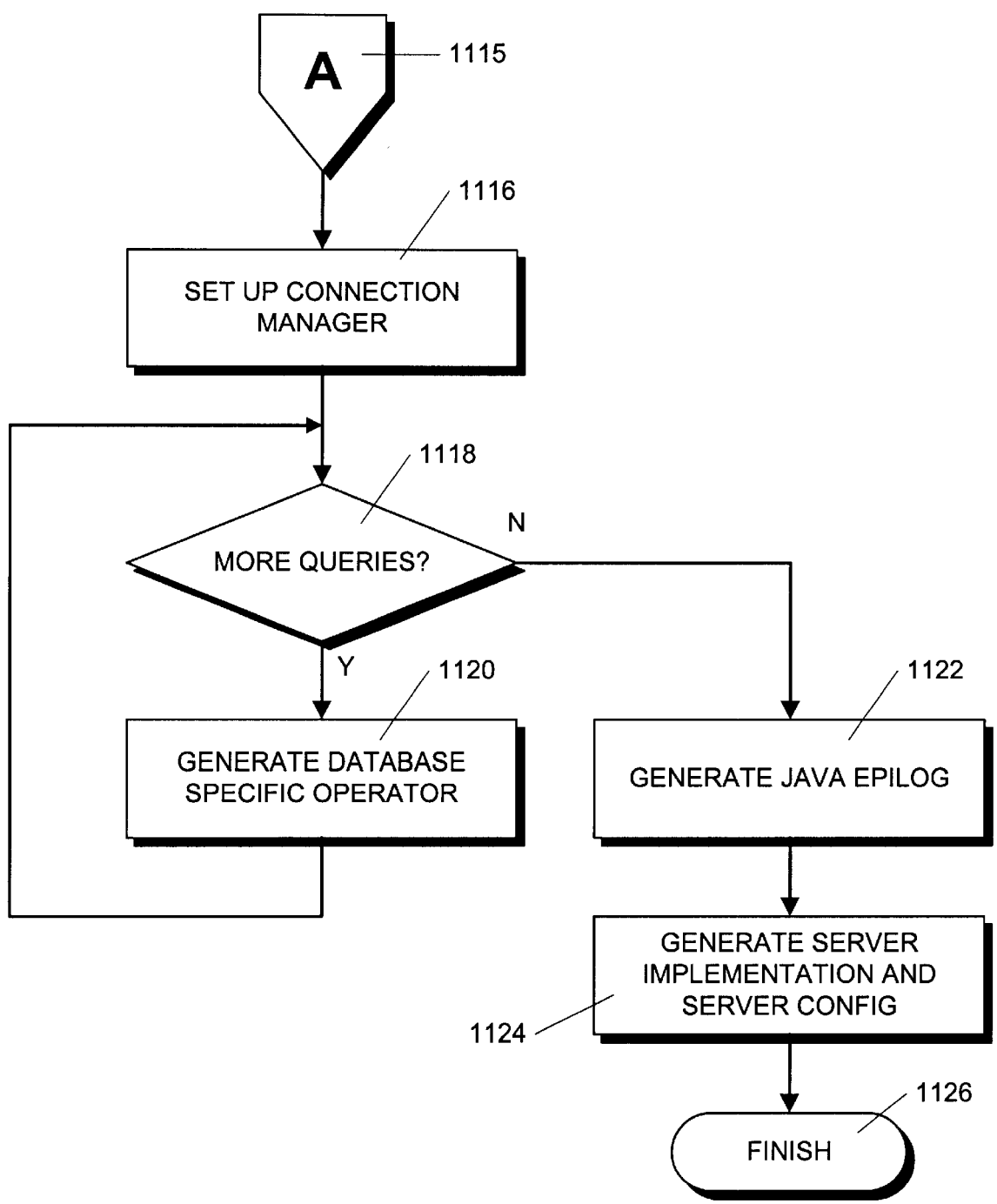

Alternatively, if, in step 916, it is determined that the query syntax is proper, the routine proceeds to step 918 where the code scripts and IDL interface code are generated as described in detail in FIGS. 11A and 11B. The routine then finishes in step 920.

Figure 10:
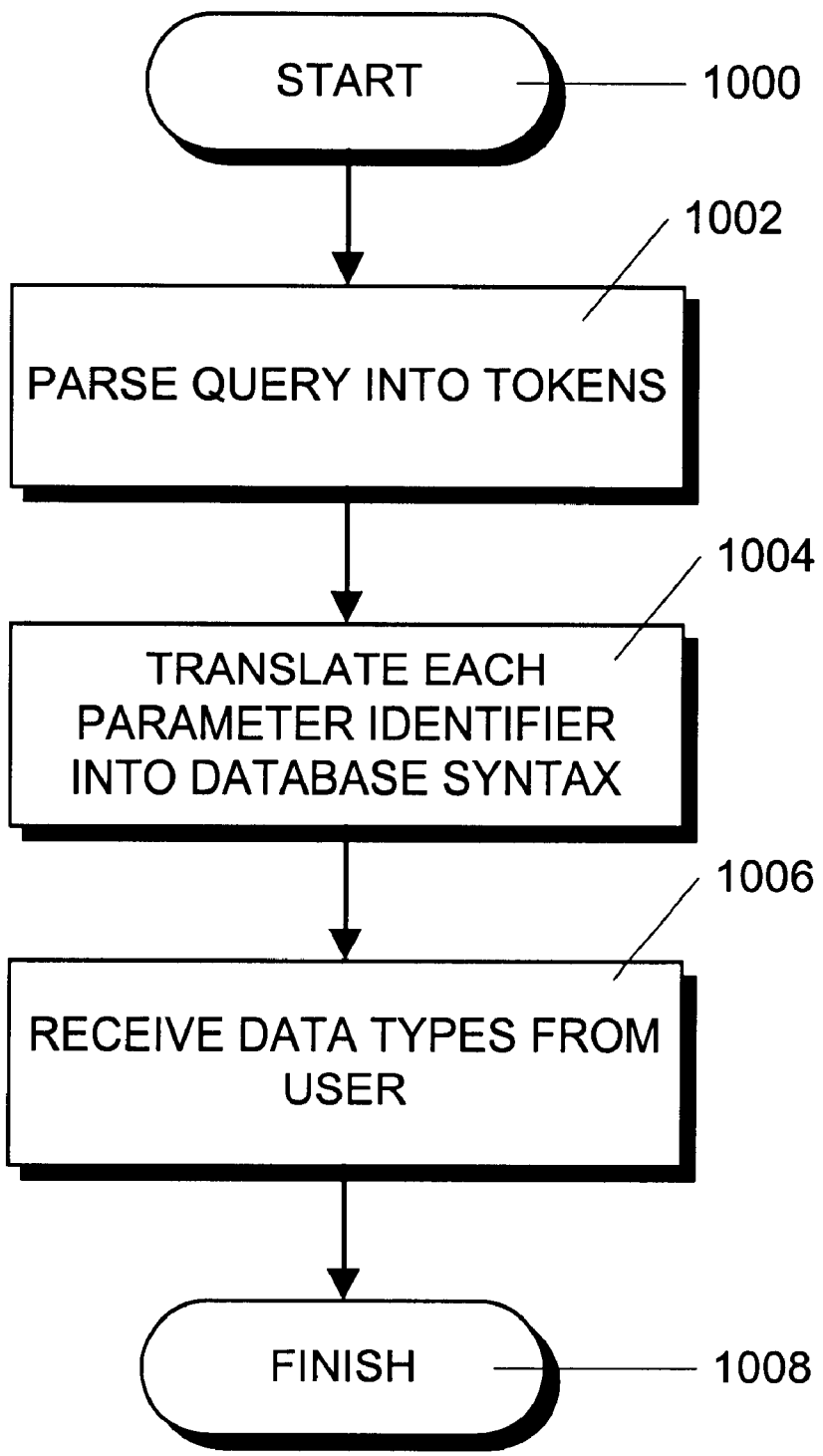
FIG. 10 is a flowchart illustrating steps involved in forming a parameter list.

The steps involved in building a parameter list are illustrated in FIG. 10. This routine starts in step 1000 and then proceeds to step 1002 where the SQL query text string is first parsed into tokens using a conventional lexical analyzer which examines the query string and breaks it up into tokens utilizing predetermined delimiters such as spaces. The tokens are then examined for a parameter identifier which may, for example, consist of colons (:) or at (@) signs that identify parameters. In step 1004 each parameter is translated into the correct underlying DBMS syntax.

Next, in step 1006, the user is prompted to identify data types, since it is not always possible to determine these from the SQL query string. The routine then finishes in step 1008.

A routine which describes the operation of the code generators is illustrated in FIGS. 11A and 11B. The routine starts in step 1100 and proceeds to step 1102 where an appropriate code generation object is instantiated using implementation language and database API specifications in the query object generator tool internal state object.

Next, in step 1104, the IDL interface code is generated. This code will later be used to generate the CORBA client stub code and server skeleton code by means of a conventional IDL compiler.

In step 1106, the tool include files are copied to make available some general information and the routine then proceeds to step 1108 where the query object implementation file is generated by templates as previously discussed.

Next, in step 1110, a build script is generated which will be used to compile the query object from the source code generated in step 1108. Next, in step 1112, a JAVA prolog is generated and the routine proceeds, via off page connectors 1114 and 1115, to FIG. 11B and step 1116 where a connection manager is set up. The connection manager allows a client to connect to the query object to perform a query. The routine then proceeds to step 1118.

In step 1118, the check is made to determine whether any unprocessed queries exist in the query object. As previously mentioned, the query object may contain one or more separate queries. If additional queries remain, the next query is processed in step 1120 where a database specific operator is generated corresponding to the query. The routine proceeds back to step 1118 to determine if any further queries exist. The operation continues in this manner until all queries are processed. The routine then proceeds to step 1122 where a JAVA epilog is generated.

In step 1124 the source code for the server implementation and server configuration files is generated. The routine then finishes in step 1126.

Figure 12:
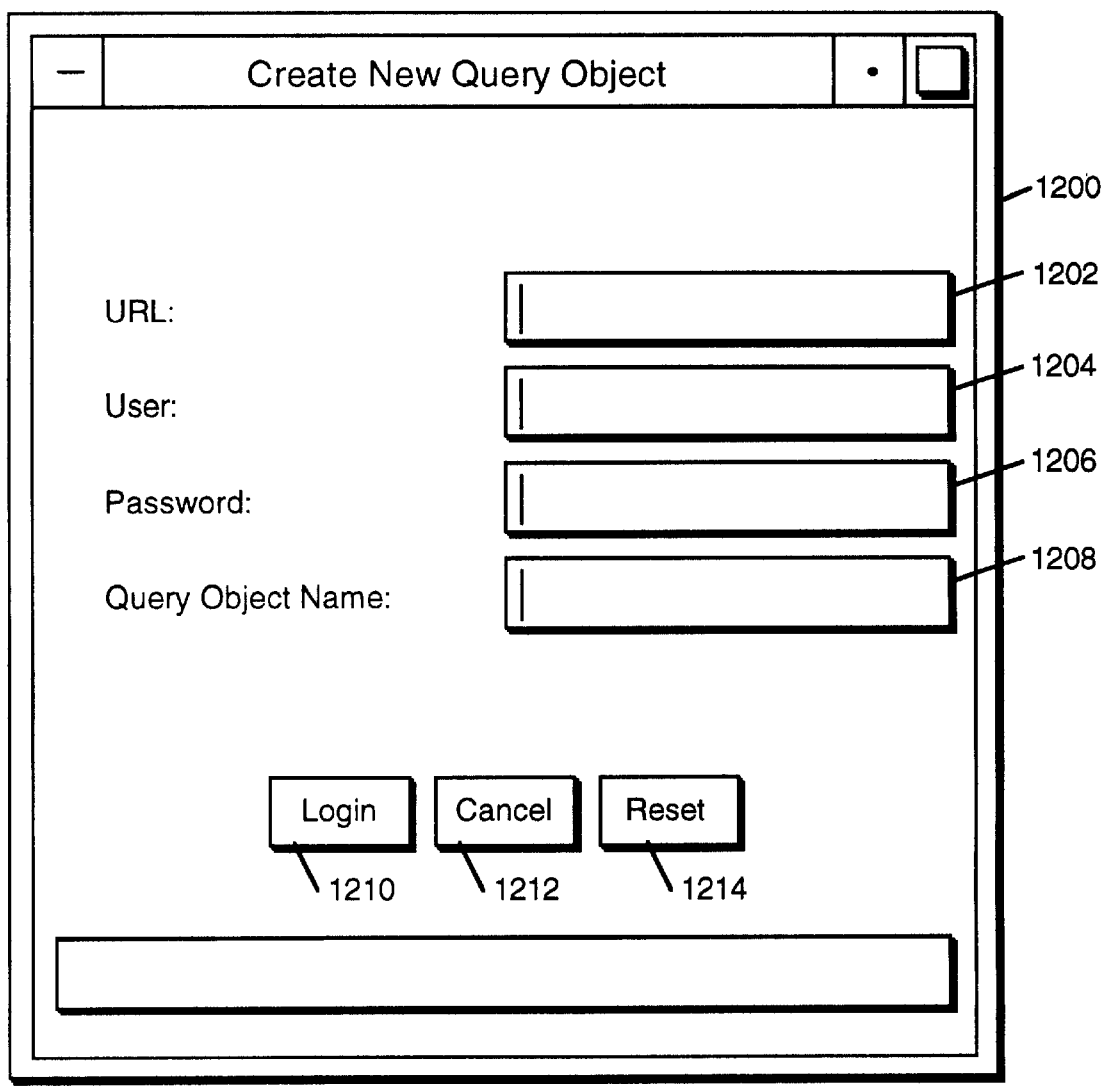
FIG. 12 is a screen display generated by the GUI of the inventive query object generator tool which allows a user to create a new query object.

As previously mentioned, the inventive query object generator tool can interact with a user by means of a graphical user interface. This GUI uses a series of display screens to guide a user toward a correctly defined query object. FIG. 12 is an illustrative screen shot which might be generated by such a graphic user interface during the start of the code generation procedures.

The initial screen which is displayed by the graphic user interface consists of a create new query object screen 1200. This screen includes four text fields 1202, 1204, 1206 and 1208 which allow the user to enter an identifier, such as URL, which specifies the location of a database in the network environment, the user's name and password and the name of the query object to be created.

After entering the information, the user presses a "Login" command button 1210 which causes the query object generator tool to establish a connection to the database with the user's name and password. Alternatively, the user can press a "Cancel" command button 1212 to cancel the operation or a "Reset" command button 1214 to clear all of the text fields 1202,1204,1206 and 1208 to blank.

Figure 13:
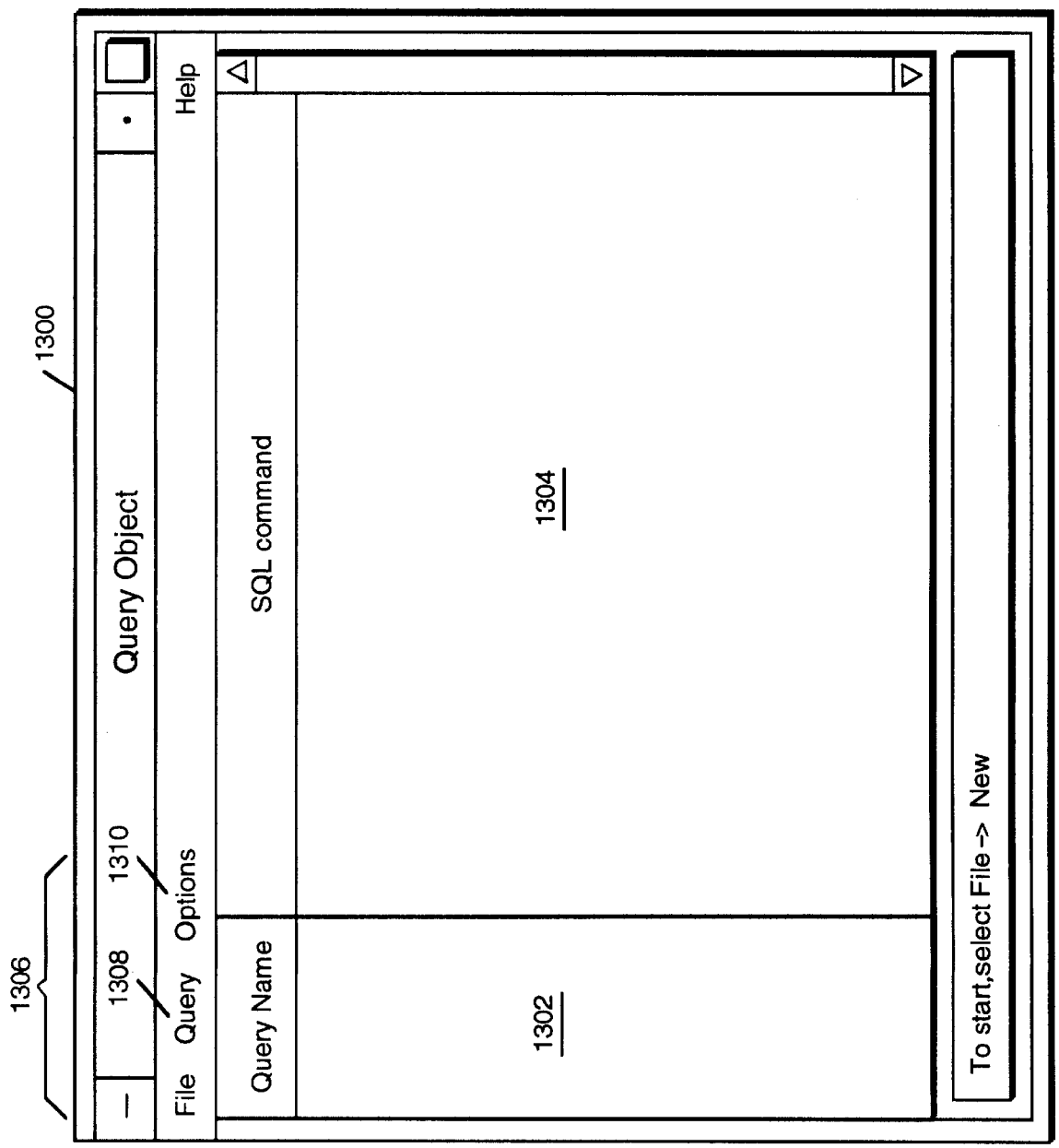
FIG. 13 is a screen display generated by the GUI of the inventive query object generator tool which allows a user to create or edit the contents of a query object.

After the user connects to the database using the screen illustrated in FIG. 12, a second screen indicating contents of the query object is displayed as is illustrated in FIG. 13. The query object generator tool is much like any other editing program which allows a user to define and examine one or more query objects, change their definitions and manipulate them in various ways. Screen 1300 has a menu of operations and shows the state of the current query object being defined. Menu options 1306 might include such options as "New" which would allow a new query object to be created. Another menu options might be "Open" which would allow an existing query object to be restored from an intermediate file. A "Save" option would allow the query object contents to be stored in the intermediate file.

Each query object contains one or more queries. Screen 1300 displays a table having two columns, 1302 and 1304, which display for each query, the query name and the SQL query string which is the subject of the query, respectively. The queries can be manipulated by the "Query" menu options 1308. These options might include such operations as "Add Query", "Delete Query" and "Modify Query".

Figure 14:
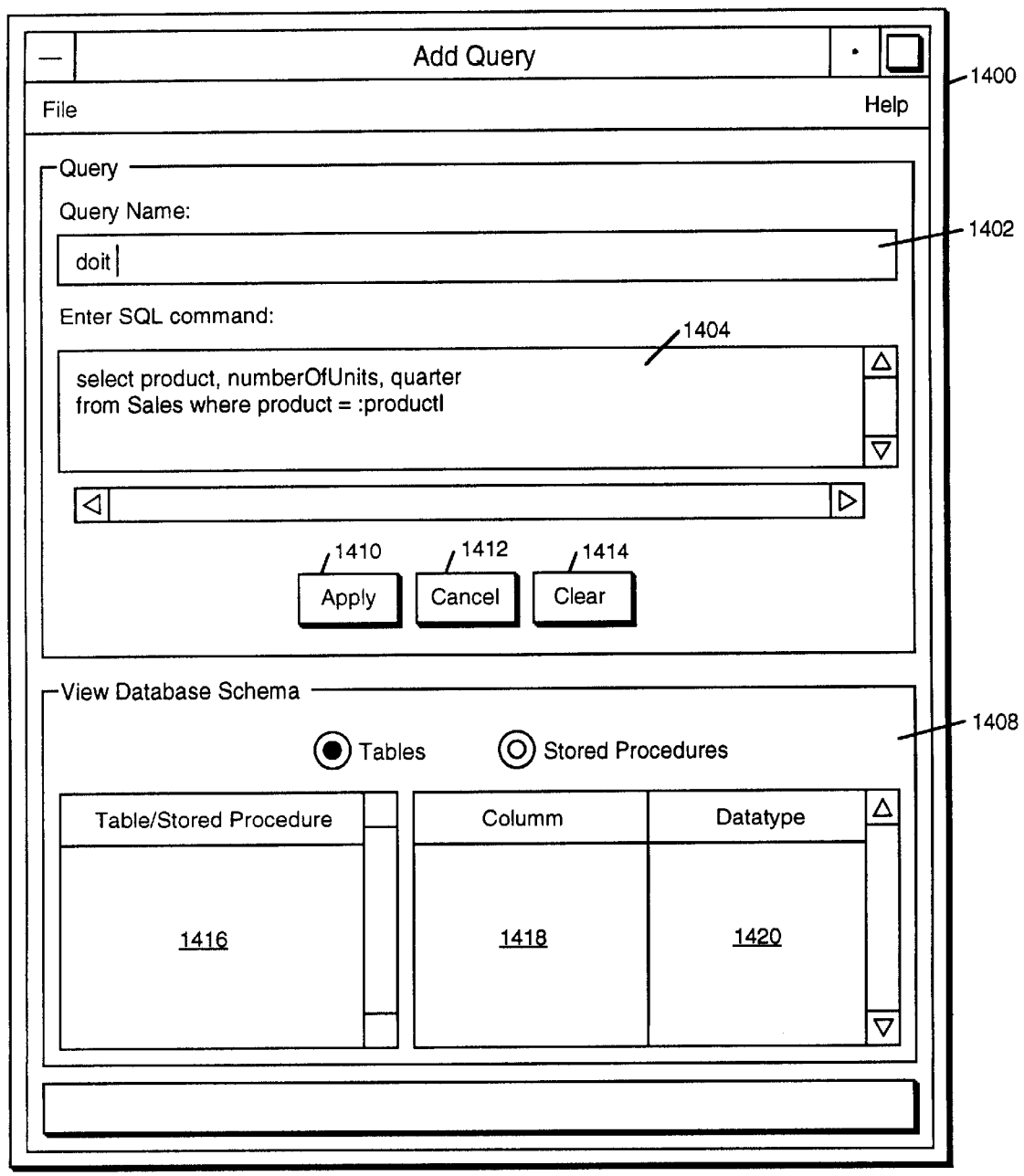
FIG. 14 is a screen display generated by the GUI of the inventive query object generator tool which allows a user to create or edit an individual query in a query object and illustrates the display of the database schema which assist the user in defining the query.

Selection of the "Add Query" option brings up the screen shown in FIG. 14. The Add Query screen 1400 contains a text field 1402 which allows entry of a query name and a text field 1404 which allows entry of the SQL query text.

The database schema area 1408 displays details of the database schema which have been previously retrieved by means of a database schema access query object or in another manner as previously described. The display consists of a scrolling list 1416 of tables, views and stored procedures. When one of these database "objects" is selected, its schema description, including column names 1418 and data types 1420 can be displayed. The schema display assists a user in correctly constructing the query string in text box 1404.

After the SQL query string has been constructed in text box 1404, the user can press the "Apply" command button 1410 which saves the query string and displays it in the table area of FIG. 13. The user can use the "Cancel" button 1412 to cancel the add query object operation or the "Clear" button 1414 which clears the contents of the text fields 1402 and 1404.

Figure 15:
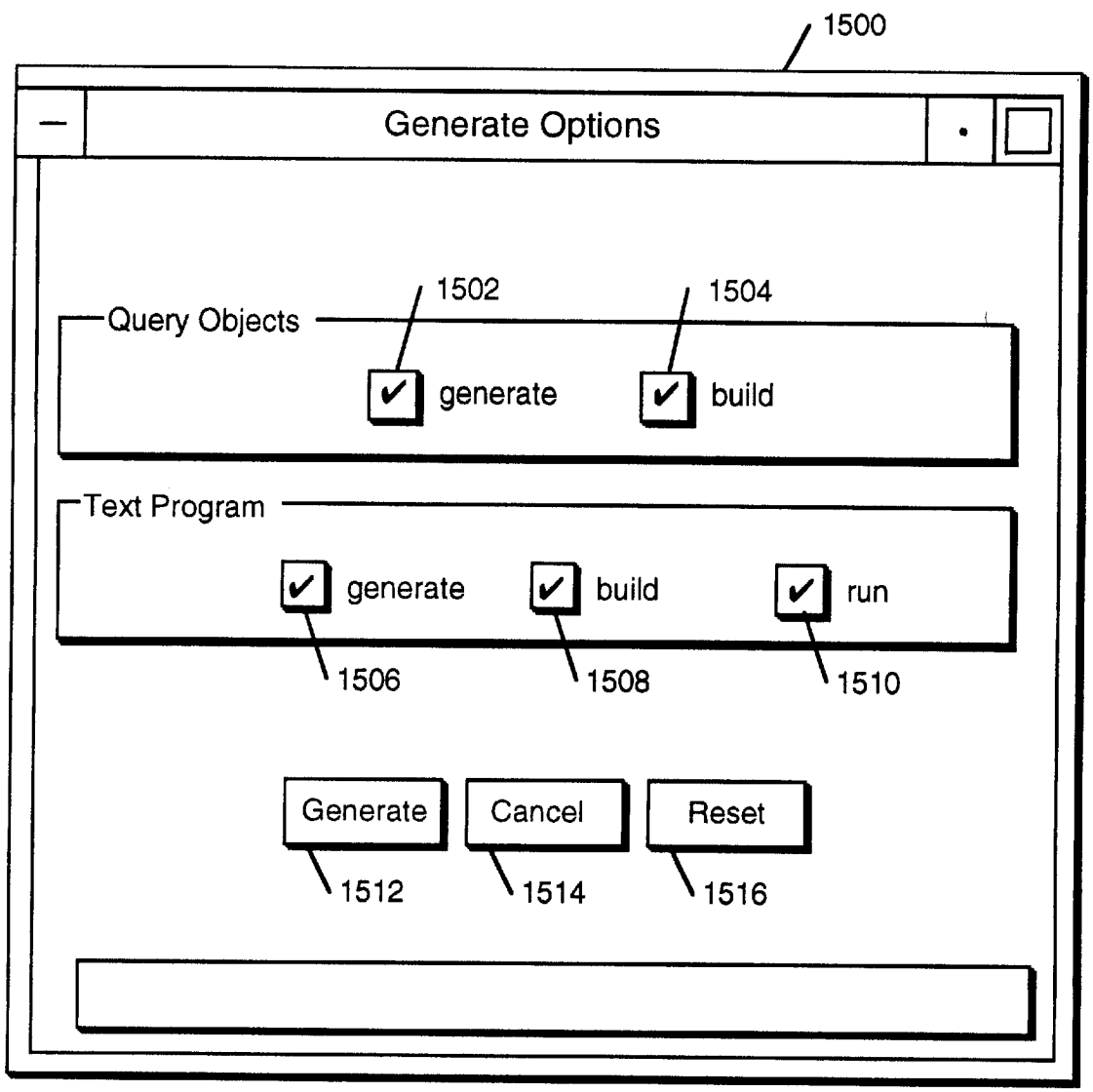
FIG. 15 is a screen display generated by the GUI of the inventive query object generator tool which allows a user to selectively generate and build a query object and an accompanying test program.

Once the queries in the query object have been defined in FIG. 13, the query object code is generated with the "Options" menu option. Selection of this latter option displays the Generate Options screen illustrated in FIG. 15. Screen 1500 displays two options for the query object which are controlled by checkboxes 1502 and 1504. These options allow the code for the query object to be generated and built, respectively. As previously mentioned, a test program can also be generated by the query object generator tool. Three options represented by checkboxes 1506, 1508 and 1510 allow code for this test program to be generated and built (controlled by checkboxes 1506 and 1508. The program can optionally be run as controlled by checkbox 1510.

After options have been selected, the corresponding operations are initiated when the user presses the "Generate" command button which starts the routine illustrated in FIG. 9, step 906. Code generation options can be canceled when the user presses the "Cancel" command button. Finally, the "Reset" command button causes the checkboxes 1502–1510 to be reset to their default configuration.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A system for generating interface definitions and source code which implement a query object for accessing a database using a predetermined programming language in a computer having a memory, the system comprising:

an input mechanism which receives an input query from a user;

a query translator which translates query commands in the input query to database commands used with the database; and at least one code generator class in the memory, which contains methods which generate the source code required to implement the query object, the code generator class generating source code that is specific to the database to be accessed and the programming language and that uses the database commands to generate the interface definitions and the source code.

2. A system according to claim 1 further comprising a display mechanism which generates a graphic user interface to allow the user to interact with the system.

3. A system according to claim 2 wherein the graphic user interface receives from the user input queries expressed as text strings.

4. A system according to claim 1 further comprising an internal state object in the memory which internal state object represents the query object.

5. A system according to claim 4 wherein the internal state object includes configuration information which can be saved and retrieved to reconstruct the query object.

6. A system according to claim 1 further comprising selected implementation logic and a code generator mechanism which instantiates the code generator object in the memory and wherein the code generator object generates both interface code to allow a client to access the query object and code which implements the query object for the selected implementation logic.

7. A system according to claim 1 further comprising a database schema access object in the memory which contains methods for accessing the database and extracting database schema information from the database.

8. A system according to claim 7 further comprising a display mechanism which generates a graphic user interface to allow the user to interact with the system and wherein the extracted database schema are displayed to the user using the graphic user interface.

9. A system according to claim 1 wherein each method which generates the source code required to implement the query object comprises a template which generates a plurality of predefined source code statements.

10. A system according to claim 9 wherein the query object comprises a plurality of queries and wherein each method which generates the code required to implement the query object further comprises a section which generates a predefined source code statement for each query in the query object.

11. A system according to claim 1 wherein each of the plurality of code generators comprises methods for generating build scripts for building a query object from the query object source code.

12. A method for generating interface definitions and source code which implement a query object for accessing a database using a predetermined programming language in a computer having a memory, the method comprising the steps of:

(a) receiving an input query from a user;

(b) translating query commands in the input query to database commands used with the database; and (c) creating a plurality of code generator classes in the memory, each of which contains methods which generate the source code required to implement the query object, the code generator classes generating source code that is specific to the database to be accessed and the programming language and that uses the database commands to generate the interface definitions and the source code.

13. A method according to claim 12 further comprising the step of:

(d) generating a graphic user interface on a display mechanism to allow the user to interact with the system.

14. A method according to claim 13 wherein step (d) further comprises the step of:

(d1) using the graphic user interface to receive from the user input queries expressed as text strings.

15. A method according to claim 12 further comprising the step of:

(e) creating an internal state object in the memory which internal state object represents the query object.

16. A method according to claim 12 wherein step (e) further comprises the step of:

(e1) creating an internal state object which includes configuration information which can be saved and retrieved to reconstruct the query object.

17. A method according to claim 12 further comprising the step of:

(f) instantiating a code generator object in the memory for the database and selected implementation logic and wherein the code generator object generates both interface code to allow a client to access the query object and source code which implements the query object for the selected implementation logic.

18. A method according to claim 12 further comprising the step of:

(g) creating a database schema access object in the memory which object contains methods for accessing the database and extracting database schema information from the database.

19. A method according to claim 18 further comprising the step of:

(h) generating a graphic user interface on a display mechanism to allow the user to interact with the system; and (i) displaying the extracted database schema to the user using the graphic user interface.

20. A method according to claim 12 wherein step (c) comprises the step of:

(c1) generating a plurality of predefined source code statements with a template.

21. A method according to claim 20 wherein the query object comprises a plurality of queries and wherein step (c) comprises the steps of:

(c2) generating a predefined source code statement for each query in the query object.

22. A method according to claim 12 wherein step (c) comprises the step of:

(c3) generating build scripts for building a query object from the query object source code.

23. A computer program product for generating interface definitions and source code which implement a query object for accessing a database using a predetermined programming language in a computer having a memory, the computer program product comprising a computer usable medium having computer readable program code thereon including:

program code which receives an input query from a user;

program code which translates query commands in the input query to database commands used with the database; and a plurality of code generator classes, each of which contains methods which generate the code required to implement the query object, the code generator classes generating source code that is specific to the database to be accessed and the programming language and uses the database commands to generate the interface definitions and the source code.

* * * * *